(12) United States Patent
Alt et al.

(10) Patent No.: US 7,756,973 B2
(45) Date of Patent: Jul. 13, 2010

(54) IDENTIFYING A CONFIGURATION FOR AN APPLICATION IN A PRODUCTION ENVIRONMENT

(75) Inventors: David Paul Alt, San Francisco, CA (US); Sarah R. Plantenberg, San Francisco, CA (US); Sandra Lee Tipton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 929 days.

(21) Appl. No.: 11/380,600

(22) Filed: Apr. 27, 2006

(65) Prior Publication Data

US 2007/0255830 A1 Nov. 1, 2007

(51) Int. Cl.
*G06F 15/173* (2006.01)
(52) U.S. Cl. ...................................... 709/224
(58) Field of Classification Search .......... 709/223–224
See application file for complete search history.

(56) References Cited

U.S. PATENT DOCUMENTS

| | | | |
|---|---|---|---|
| 5,088,058 A | 2/1992 | Salsburg | |
| 5,630,025 A | 5/1997 | Dolby et al. | |
| 5,640,596 A | 6/1997 | Takamoto et al. | |
| 5,764,961 A | 6/1998 | Bhat | |
| 5,790,425 A | 8/1998 | Wagle | |
| 5,812,780 A * | 9/1998 | Chen et al. | 709/224 |
| 5,819,030 A | 10/1998 | Chen et al. | |
| 5,819,033 A | 10/1998 | Caccavale | |
| 5,881,268 A | 3/1999 | McDonald et al. | |
| 5,991,705 A | 11/1999 | Klein et al. | |
| 6,003,047 A | 12/1999 | Osmond et al. | |
| 6,003,083 A | 12/1999 | Davies et al. | |
| 6,014,669 A | 1/2000 | Slaughter et al. | |
| 6,014,697 A | 1/2000 | Lewis et al. | |
| 6,059,842 A | 5/2000 | Dumarot et al. | |
| 6,067,412 A * | 5/2000 | Blake et al. | 718/102 |
| 6,070,190 A | 5/2000 | Reps et al. | |
| 6,086,617 A | 7/2000 | Waldon et al. | |
| 6,110,214 A | 8/2000 | Klimasauskas | |
| 6,125,408 A | 9/2000 | McGee et al. | |

(Continued)

OTHER PUBLICATIONS

Popa, et al., "Using code Collection to Support Large Applications on Mobile Devices," Mobicom '04, Sep. 26-Oct. 1, 2004, Philadelphia, Pennsylvania, USA, pp. 16-29, ACM Digital Library.

(Continued)

*Primary Examiner*—J Bret Dennison
(74) *Attorney, Agent, or Firm*—Janet M. Skafar; Christine H. Smith; Matthew W. Baca

(57) ABSTRACT

Various embodiments of a computer-implemented method, computer system and computer program product provide a configuration recommendation. Request-processing performance data of an application is received. The request-processing performance data is collected by an application monitor during an execution of the application on a source hardware system. One or more request-processing performance measurements are determined based on the request-processing performance data. One or more target objectives of the application are received. An analytic engine is invoked to provide a configuration recommendation of a target hardware system on which to execute the application based on one or more request-processing performance measurements and one or more target objectives.

35 Claims, 23 Drawing Sheets

U.S. PATENT DOCUMENTS

| | | | |
|---|---|---|---|
| 6,141,759 | A | 10/2000 | Braddy |
| 6,182,206 | B1 | 1/2001 | Baxter |
| 6,202,190 | B1 | 3/2001 | Rogier |
| 6,304,913 | B1 | 10/2001 | Rune |
| 6,408,300 | B1 | 6/2002 | Bergman et al. |
| 6,453,426 | B1 | 9/2002 | Gamache et al. |
| 6,704,804 | B1 | 3/2004 | Wilson et al. |
| 6,742,143 | B2 * | 5/2004 | Kaler et al. ................ 714/39 |
| 6,760,888 | B2 | 7/2004 | Killian et al. |
| 6,768,968 | B2 | 7/2004 | Ignatowski et al. |
| 6,789,050 | B1 | 9/2004 | Reeser et al. |
| 6,801,940 | B1 | 10/2004 | Moran et al. |
| 6,816,886 | B2 * | 11/2004 | Elvanoglu et al. ........... 709/206 |
| 7,099,816 | B2 | 8/2006 | Ignatowski et al. |
| 7,222,269 | B2 * | 5/2007 | Kurinami et al. .............. 714/47 |
| 7,366,108 | B2 | 4/2008 | Szentesi et al. |
| 7,529,814 | B2 | 5/2009 | Wadia et al. |
| 2002/0010852 | A1 | 1/2002 | Arnold et al. |
| 2002/0072956 | A1 | 6/2002 | Willems et al. |
| 2002/0107954 | A1 | 8/2002 | Ferguson et al. |
| 2002/0107977 | A1 | 8/2002 | Dunshea et al. |
| 2002/0112038 | A1 | 8/2002 | Hessmer et al. |
| 2002/0126701 | A1 | 9/2002 | Requena |
| 2002/0138226 | A1 * | 9/2002 | Doane ..................... 702/119 |
| 2002/0138443 | A1 * | 9/2002 | Schran et al. ................ 705/64 |
| 2003/0093717 | A1 * | 5/2003 | Mason ..................... 714/38 |
| 2003/0135609 | A1 * | 7/2003 | Carlson et al. .............. 709/224 |
| 2003/0177160 | A1 | 9/2003 | Chiu et al. |
| 2003/0204588 | A1 * | 10/2003 | Peebles et al. .............. 709/224 |
| 2003/0204781 | A1 * | 10/2003 | Peebles et al. ............... 714/25 |
| 2003/0208284 | A1 * | 11/2003 | Stewart et al. ............... 700/30 |
| 2003/0229695 | A1 | 12/2003 | Mc Bride |
| 2003/0233220 | A1 | 12/2003 | Ignatowski et al. |
| 2004/0064577 | A1 | 4/2004 | Dahlin et al. |
| 2004/0181794 | A1 | 9/2004 | Coleman et al. |
| 2004/0205120 | A1 * | 10/2004 | Dar et al. ................... 709/203 |
| 2004/0210884 | A1 | 10/2004 | Raghavachari et al. |
| 2005/0086331 | A1 * | 4/2005 | Wadia et al. ............... 709/221 |
| 2005/0091366 | A1 * | 4/2005 | Acharya ................... 709/224 |
| 2005/0122987 | A1 | 7/2005 | Ignatowski et al. |
| 2006/0074970 | A1 * | 4/2006 | Narayanan et al. .......... 707/102 |
| 2006/0149408 | A1 * | 7/2006 | Speeter et al. ............. 700/126 |
| 2006/0218533 | A1 * | 9/2006 | Koduru et al. .............. 717/124 |
| 2007/0005330 | A9 | 1/2007 | Hardwick et al. |
| 2007/0078825 | A1 * | 4/2007 | Bornhoevd et al. ............ 707/3 |
| 2007/0083793 | A1 * | 4/2007 | Roth .......................... 714/25 |
| 2007/0156375 | A1 * | 7/2007 | Meier et al. .................... 703/6 |
| 2007/0180097 | A1 * | 8/2007 | Roth .......................... 709/223 |
| 2007/0185984 | A1 * | 8/2007 | Roth .......................... 709/223 |
| 2008/0229300 | A1 * | 9/2008 | O'Brien ..................... 717/168 |

OTHER PUBLICATIONS

Anzbock, R. et al., "Software Configuration, Distribution, and Deployment of Web-Services," SEKE '02, Jul. 15-19, 2002, Ishcia, Italy, pp. 649-656, ACM Digital Library.

Stidolph, W., "Evolutionary Design of Complex Software (EDCS) Demonstration Days 1999," ACM SIGSOFT, Software Engineering Notes, vol. 25, No. 1, Jan. 2000, pp. 95-108, ACM Digital Library.

IBM Software—WebShere Studio Application Monitor [online] Copyright IBM Corporation 2004 [Retrieved on Mar. 8, 2006] Retrieved from the Internet: <URL: http://ftp.software.ibm.com/software/awdtools/studioapplicationmonitor/library/wsamv31_datasheet.pdf> 6 pages.

WebSphere Studio Application Monitor User's Guide [online]Nov. 2004[Retrieved on Mar. 8, 2006] Retrieved from the Internet: <URL: http://ftp.software.com/software/awdtools/studioapplicationmonitor/library/usrmst.pdf> pp. 1-191.

Subrahmonia, J., et al, U.S. Appl. No. 11/203,464, filed on Aug. 12, 2005, "Integrating Performance, Sizing, and Provisioning Techniques with a Business Process," assignee International Business Machines Corporation, 33 pages.

Aversa, R., et al, "Design of a simulator of heterogeneous computing environments," Simulation Practice and Theroy, vol. 4, Issues 2-3, May 15, 1996, pp. 97-117.

"SQL Server Configuration Performance Checklist," [online] Copyright 2000-2003 SQL-Server-Performance.Com [Retrieved on Oct. 13, 2003] Retrieved from the Internet: <URL: http://www.sql-server-performance.com/sql_server_performance_audit5.asp> 9 pages.

Notice of Allowance mailed on Jun. 16, 2006 for U.S. Appl. No. 10/174,030 <4 pages>.

Office Action mailed on Feb. 24, 2006 for U.S. Appl. No. 10/174,030 <6 pages>.

Notice of Allowance mailed on Dec. 30, 2008 for U.S. Appl. No. 10/686,988 <7 pages>.

Office Action mailed on Aug. 6, 2008 for U.S. Appl. No. 10/686,988 <7 pages>.

* cited by examiner

Initial Configuration Estimate Report Wizard: "Recommendation" window: Solution

Initial Configuration Estimate Report Wizard: "Recommendation" window: Utilization

IDENTIFYING A CONFIGURATION FOR AN APPLICATION IN A PRODUCTION ENVIRONMENT

CROSS-REFERENCE TO RELATED APPLICATIONS

In co-pending application Ser. No. 10/686,988, entitled "Autonomic Computing Algorithm for Identification of an Optimum Configuration for a Web Infrastructure," filed Oct. 15, 2003, by Noshir C. Wadia and Peng Ye, assigned to the assignee of the present invention, and incorporated herein by reference in its entirety, there is described various embodiments of a method, system and article of manufacture for autonomic identification of an optimum hardware configuration for a Web infrastructure. Although not limited thereto, various embodiments of the present invention employ embodiments of the method, system and article of manufacture for autonomic identification of an optimum hardware configuration for a Web infrastructure.

In co-pending application Ser. No. 10/174,030, entitled "Method, System and Article of Manufacture for an Analytic Modeling Technique for Handling Multiple Objectives," filed Jun. 17, 2002, by Michael Ignatowski and Noshir C. Wadia, assigned to the assignee of the present invention, and incorporated herein by reference in its entirety, there is described various embodiments of a method, system and article of manufacture method, system and article of manufacture for an analytic modeling technique for handling multiple objectives. Although not limited thereto, various embodiments of the present invention employ embodiments of the method, system and article of manufacture method, system and article of manufacture for an analytic modeling technique for handling multiple objectives.

BACKGROUND OF THE INVENTION 1.0 Field of the Invention

This invention relates to identifying a configuration for an application; and in particular, this invention relates to identifying a configuration for an application in a production environment.

2.0 Description of the Related Art

Many businesses provide services using the Internet. FIG. 1 depicts an exemplary web application environment 20 which provides a web service. A number of clients at, for example, a cell phone 22-1, a server 22-2, and computer systems 22-3 and 22-4 connect to a network 24 such as the Internet and request information, such as a web page, from a web server 26. The web server 26 receives the request and returns a response to the request, for example, the web page. The exemplary web server 26 of FIG. 1 comprises various types of application software and hardware on which that application software executes.

In FIG. 1, the web server 26 has three tiers. A first tier has one or more web presentation servers 28. The web presentation servers 28 are software applications which respond to requests from the clients and provide the response if the information is available at the presentation server, or pass the request to the second tier.

The second tier has one or more web application servers 30. The web application servers are software applications which provide integration business logic to execute the web application. In this example, the web application servers 30 access a third tier. The third tier has one or more database servers 32. The database servers are also software applications. For example, if the processing of the request reaches the database servers 32, the requested data is passed to the web application servers 30, which may further processes the requested data, and pass the requested data to the web presentation servers 28 which generate a web page which is returned to the client.

In this example, each tier of server application software executes on computer system hardware which is separate from the computer system hardware of the other tiers. In some web application environments, each web presentation server, web application server, and database server may execute on a different computer system. Other web application environments may combine the functionality of the tiers on a single computer system. Yet other web application environments may combine the functionality of the web presentation servers and application servers on a single computer system separate from the database servers. In various web application environments, an edge server may be between the presentation server(s) 28 and the network 24.

When businesses plan to provide a new web application, or provide an existing application to a larger group of users, the configuration of the hardware that will handle the load of the application and that will satisfy performance targets at an acceptable cost, needs to be determined. Therefore, there is a need for a technique to determine a hardware configuration to implement a new or expand an existing application.

SUMMARY OF THE INVENTION

To overcome the limitations in the prior art described above, and to overcome other limitations that will become apparent upon reading and understanding the present specification, various embodiments of a computer-implemented method, computer system and computer program product provide a configuration recommendation. Request-processing performance data of an application is received. The request-processing performance data is collected by an application monitor during an execution of the application on a source hardware system. One or more request-processing performance measurements are determined based on the request-processing performance data. One or more target objectives of the application are received. An analytic engine is invoked to provide a configuration recommendation of a target hardware system on which to execute the application based on the one or more request-processing performance measurements, and the one or more target objectives.

In this way, various embodiments provide a technique to determine a hardware configuration to implement a new or expand an existing application.

BRIEF DESCRIPTION OF THE DRAWINGS

The teachings of the present invention can be readily understood by considering the following description in conjunction with the accompanying drawings, in which.

To facilitate understanding, identical reference numerals have been used, where possible, to designate identical elements that are common to some of the figures.

DETAILED DESCRIPTION

After considering the following description, those skilled in the art will clearly realize that the teachings of the various embodiments of the present invention can be utilized to provide a hardware configuration recommendation. Request-processing performance data of an application is received. The request-processing performance data is collected by an application monitor during an execution of the application on a source hardware system. One or more request-processing performance measurements are determined based on the request-processing performance data. One or more target objectives of the application are received. An analytic engine is invoked to provide a configuration recommendation of a target hardware system on which to execute the application based on the performance measurements, and one or more target objectives.

The source hardware system is a data processing system such as a server computer. In various embodiments, the server computer may execute the Windows, AIX, Linux, MVS, z/OS, Solaris, HP-UX or Unix operating system. In other embodiments, the server computer may execute other operating systems. The target hardware system is also a data processing system such as a server computer which may execute any of the operating systems described above.

Various embodiments of the present invention provide a process that integrates data collection on software application executing on a source computer system with an analytic engine that provides a hardware configuration recommendation for a target computer system. In various embodiments, the analytic engine may be a capacity planning tool, and in other embodiments, the analytic engine may be a mathematical modeling tool. In some embodiments, the analytic engine implements a method, system and article of manufacture for autonomic identification of an optimum hardware configuration for a Web infrastructure as described in U.S. patent application Ser. No. 10/686,988, titled "Autonomic Computing Algorithm for Identification of an Optimum Configuration for a Web Infrastructure". In other embodiments, other analytic engines may be used.

Various embodiments of the present invention facilitate the Information Technology Infrastructure Library Application Management process.

Figure 2:
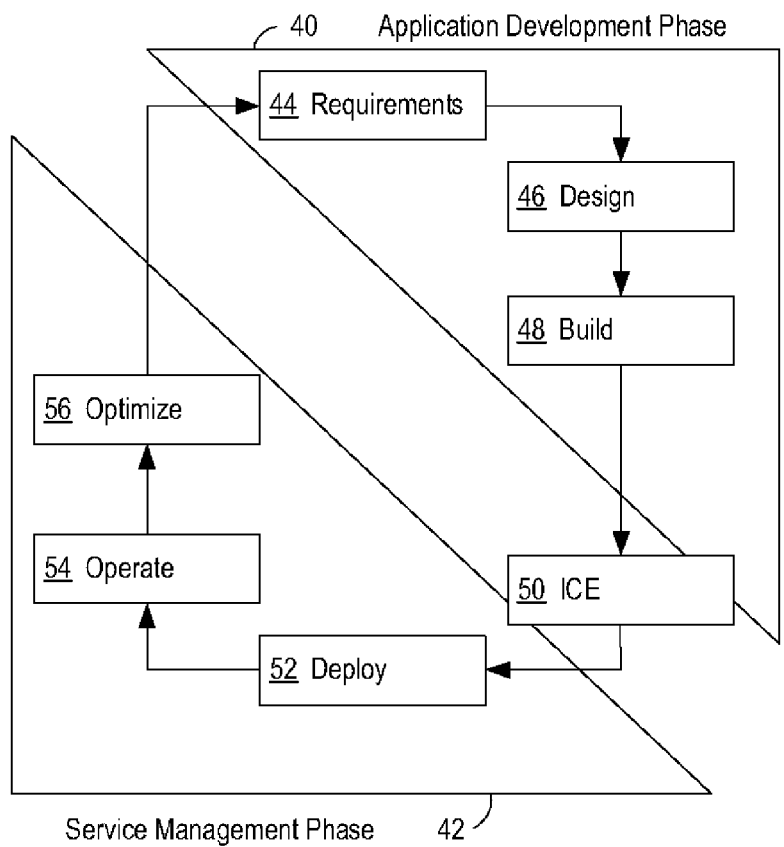
FIG. 2 depicts a diagram illustrating the context of an embodiment of the present invention between a development phase and a service management phase of an application in the Information Technology Infrastructure Library (ITIL) Application Management process.

FIG. 2 depicts a diagram illustrating the context of an embodiment of the present invention between a development phase 40 and a service management phase 42 of an application in the Information Technology Infrastructure Library Application Management process. The area between the application development phase 40 and service management phase 42 represents the gap between these phases.

In the application development phase 40, in step 44, requirements are generated. In step 46, a software design is generated based on the requirements. In step 48, application software is built based on the software design.

In step 50, an initial configuration estimate is made for the application software, also referred to as the application. In various embodiments, an Initial Configuration Estimate (ICE) module invokes an analytic engine to provide a configuration recommendation of a target computer system on which to execute the application based on target objectives and performance data of an execution of the application on an existing computer system, that is, a hardware system. In some embodiments, the ICE module is implemented as a wizard. The ICE wizard is used to bridge the gap between the application development phase 40 and the service management phase 42. Typically the target computer system is in a production execution environment. In various embodiments, using performance data from an execution of the application on an existing computer system in an execution environment, whether that execution environment is a pre-production, quality assurance or existing production environment, improves the accuracy of the analytic engine's recommendation because the calculations performed by the analytic engine are based on an actual execution of the application.

In the service management phase 42, in step 52, the application is deployed to the target computer system. The target computer system is configured in accordance with the recommendation of the analytic engine. In step 54, the application is operated. In step 56, various optimizations may be applied to the application and the environment.

Figure 3A:
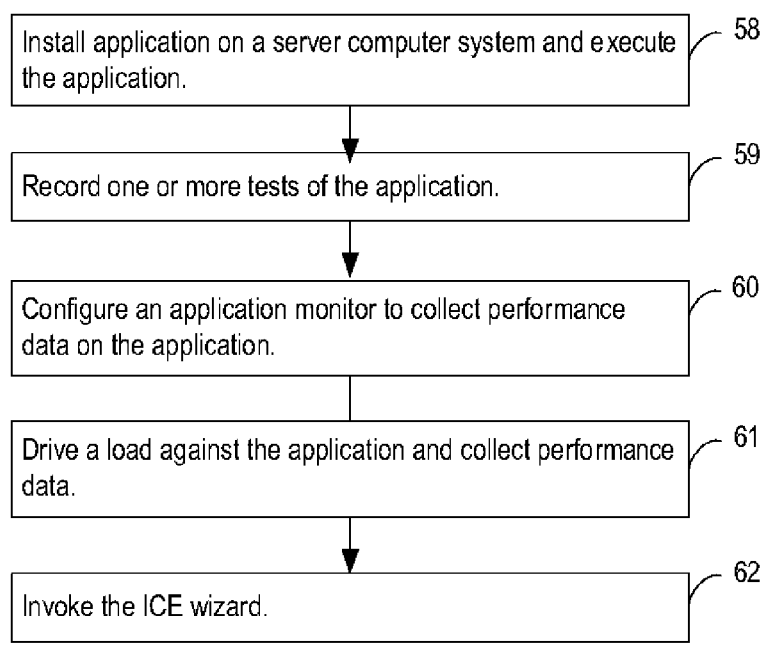
FIG. 3A depicts a flowchart of an embodiment of collecting performance data of an application and invoking an Initial Configuration Estimate (ICE) wizard to provide a configuration recommendation.

FIG. 3A depicts a flowchart of an embodiment of collecting performance data of an application and invoking the ICE wizard to provide a configuration recommendation. In step 58, the user installs the application on a server computer system, also referred to as a source computer system, and executes the application. In some embodiments, the source computer system is chosen to be suitable for benchmarking the application. In step 59, the user records one or more of tests of the application.

In step 60, the user configures an application monitor to collect data on the application. In various embodiments, the user configures a data collector which is part of the application monitor. In some embodiments, the application monitor is the IBM WebSphere Application Monitor (WSAM); however, the invention is not meant to be limited to WSAM and other application monitors may be used. In some embodiments, the user schedules the playback of the recorded tests on the application.

In step 61, a load is driven against the application once the application monitor is monitoring the application and performance data is collected. The load comprises requests such as requests for web pages. In, for example, a pre-production, quality assurance and development environment, a load is driven against the application using automation software, for example, the recorded tests are played back. In an alternate embodiment, for example, in a production environment, step 61 is omitted and the application serves its usual traffic; therefore the load comprises requests from users of the application.

In step 62, the user invokes the ICE wizard.

Figure 3B:
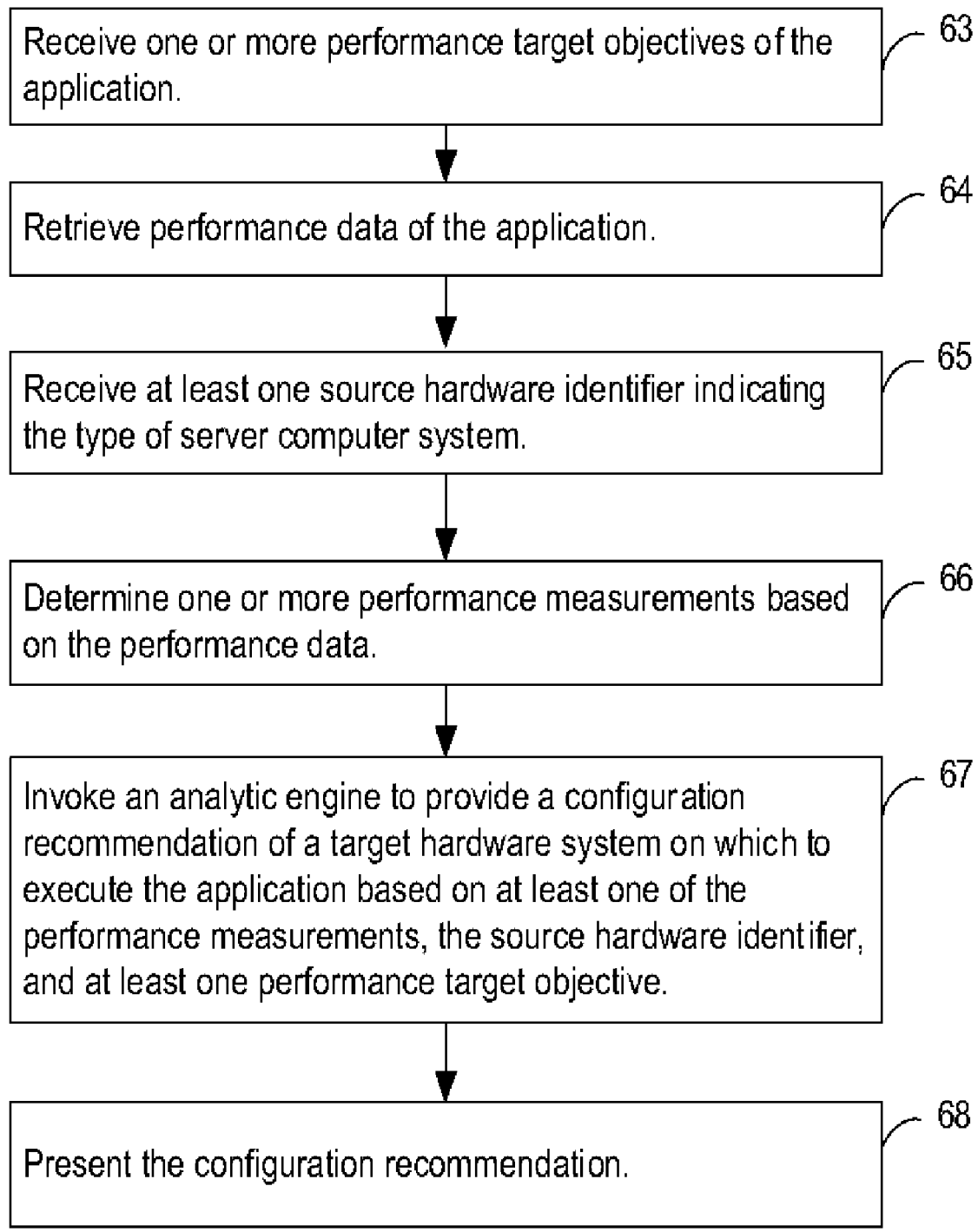
FIG. 3B depicts a flowchart of an embodiment of a process performed by the ICE wizard which is invoked in a step of the flowchart of FIG. 3A.

FIG. 3B depicts a flowchart of an embodiment of a process performed by the ICE wizard which is invoked in step 62 of the flowchart of FIG. 3A. In FIG. 3B, in step 63, the ICE wizard receives one or more target objectives of the application. In various embodiments, the user specifies at least one target objective for the application. For example, the user specifies either an arrival rate (a number of user visits per second to a web page) or a page view rate (a number of times that a web page is viewed per second). The user may also specify other target objectives, such as a response time per page view in seconds, an average user session time in seconds, a number of concurrent users in seconds, and a processor (central processing unit (CPU)) utilization percentage.

In step 64, the ICE wizard retrieves performance data of the application. The performance data is collected by the application monitor. In various embodiments, the performance data comprises request-processing performance data.

In step 65, the ICE wizard receives at least one source hardware identifier indicating the type of server computer system on which the performance data of the application is collected.

In step 66, the ICE wizard determines one or more performance measurements based on the performance data. The ICE wizard transforms at least a portion of the performance data which is collected by the application monitor to provide one or more performance measurements suitable for the analytic engine. In various embodiments, the ICE wizard computes at least one performance measurement based on the performance data.

In step 67, the ICE wizard invokes the analytic engine to provide a configuration recommendation of a target hardware system on which to execute the application based on at least one of the performance measurements, the source hardware identifier and at least one target objective. In various embodiments, the ICE wizard provides at least one of the performance measurements, the source hardware identifier, and one or more target objectives as parameters to the analytic engine.

In some embodiments, for example, in which the ICE wizard and analytic engine are used with a predetermined source hardware system, step 65 is omitted and the source hardware identifier is not provided to the analytic engine.

In step 68, the ICE wizard presents the configuration recommendation. In various embodiments, the ICE wizard presents the configuration recommendation on a display. In other embodiments, other output devices such a printer may be used.

Figure 4:
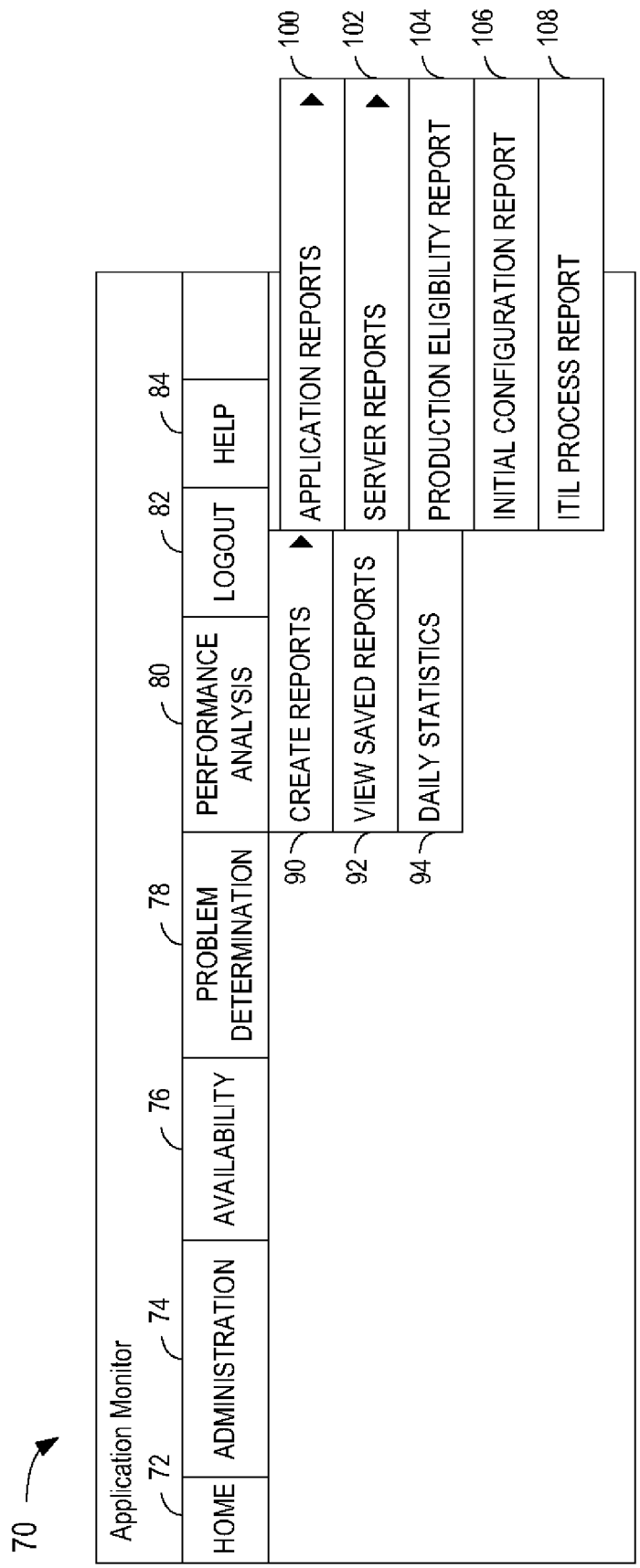
FIG. 4 depicts a diagram of an embodiment of a portion of an application monitor window which interfaces with an embodiment of the present invention.

FIG. 4 depicts a diagram of an embodiment of a portion of an application monitor window 70 which interfaces with an embodiment of the present invention. In various embodiments, the application monitor is IBM WebSphere Studio Application Monitor which provides an interface to the ICE module. The application monitor window 70 has a "HOME" button 72, an "ADMINISTRATION" button 74, and "AVAILABILITY" button 76, a "PROBLEM DETERMINATION" button 78, a "PERFORMANCE ANALYSIS" menu button 80, a "LOGOUT" button 82 and a "HELP" button 84.

In response to activating the "PERFORMANCE ANALYSIS" menu button 80, a menu is displayed. The menu comprises a "CREATE REPORTS" menu item button 90, a "VIEW SAVED REPORTS" button 92, and a "DAILY STATISTICS" button 94. A button may be activated using any well-known manner such as clicking on the button using a mouse, activating the button using a keyboard, or other techniques that are known or that may become known.

In response to activating the "CREATE REPORTS" menu item button 90, another menu is displayed. This menu comprises an "APPLICATION REPORTS" menu button 100, a "SERVER REPORTS" menu button 102, a "PRODUCTION ELIGIBILITY REPORT" button 104, an "INITIAL CONFIGURATION REPORT" button 106, and an "ITIL PROCESS REPORT" button 108.

Figure 5:
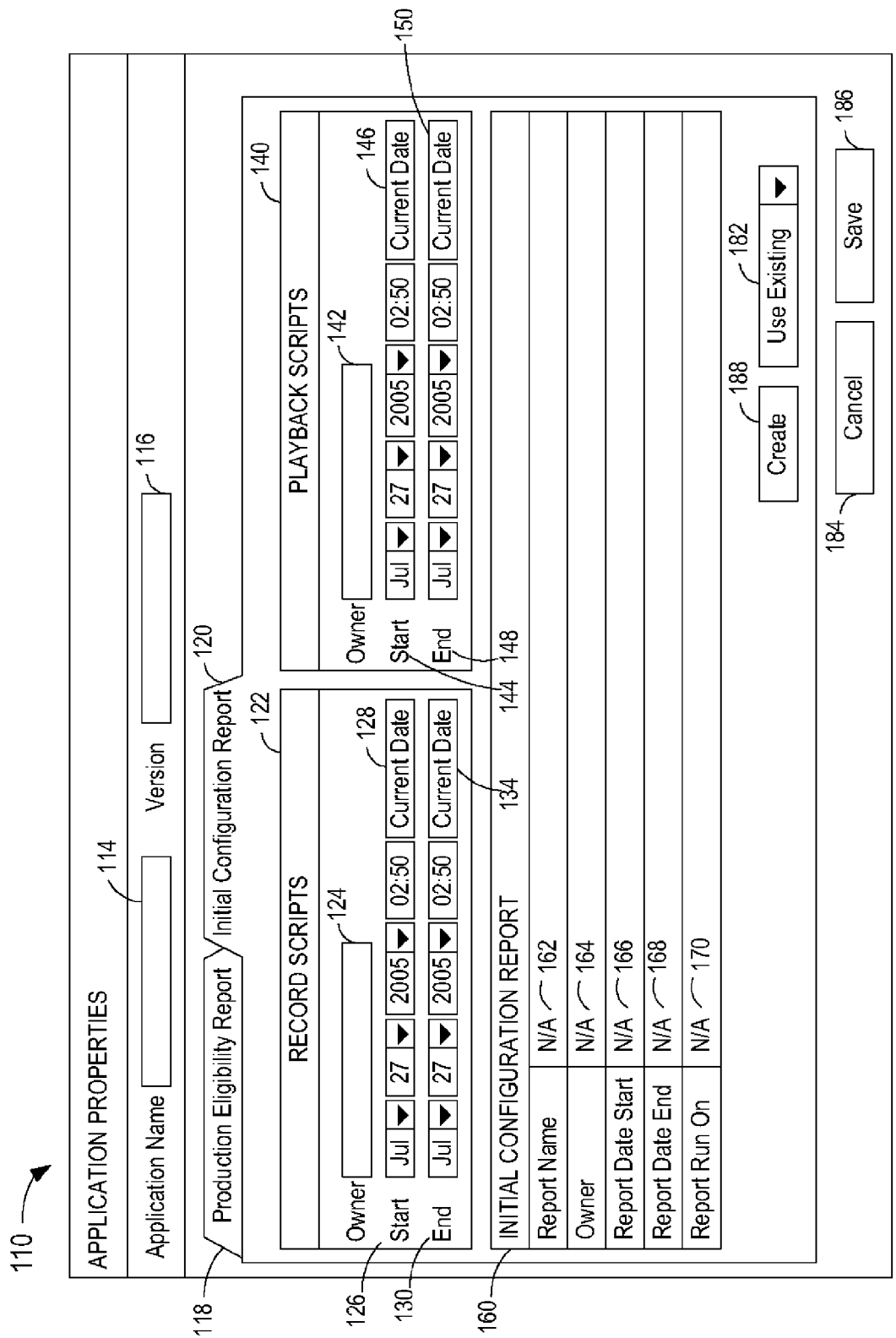
FIG. 5 depicts a diagram of an embodiment of an Application Properties window.

FIG. 5 depicts a diagram of an embodiment of an Application Properties window 110. In various embodiments, in response to activating the "ITIL PROCESS REPORT" button 108 (FIG. 4) the "APPLICATION PROPERTIES" window 110 is displayed. The "APPLICATION PROPERTIES" window 110 specifies properties which uniquely identify the application for which the initial configuration estimate is being performed.

In the "APPLICATION PROPERTIES" window 110, an "Application Name" text box 114 allows a user to enter the name of the application, and a "Version" text box 116 allows a user to enter the version of the application.

The "APPLICATION PROPERTIES" window 110 has a "Production Eligibility Report" tab 118 and an "Initial Configuration Report" tab 120. In the "Initial Configuration Report" tab 120, record scripts, playback scripts and various parameters of the Initial Configuration Report may be specified. In some embodiments, to gather performance data, the user executes record and playback scripts in a sequential stream for a desired or predetermined period of time. The user reports this activity in the "Initial Configuration Report" tab 120.

In a "RECORD SCRIPTS" area 122, an "Owner" text box 124 allows a user to specify an owner. A start date and time 126 of a record script can be specified, or a current date may be selected using the "Current Date" button 130. The user enters an end date and time of when the user completed the process of recording scripts in end date and time text boxes 132, or a current date may be entered as the end date and time by activating the "Current Date" button 134.

In a "PLAYBACK SCRIPTS" area 140, an "Owner" text box 142 allows a user to specify a name of the owner who played back, or scheduled the playback of, the scripts. The user enters a start date and time of when the user began the process of playing back a script in a start date and time 142 text box. A current date and time may be entered into the start date and time text boxes 144 by activating the "Current Date" button 146.

The end date and time specifies the date and time when the user completed the process of recording scripts. The user enters the end date and time of when the user completed the process of playing back the scripts in end date and time text boxes 148. A current date and time may be entered into the end date and time text boxes 148 by activating the "Current Date" button 150.

The start date and time and end date and time of the "PLAYBACK SCRIPTS" area help users to organize their workflow. In various embodiments, there is no relationship between the start date and time, and end date and time, which is entered in the "PLAYBACK SCRIPTS" area and any other processes, such as the execution of the test scripts. In some embodiments, a record script and a playback script are not specified.

An "INITIAL CONFIGURATION REPORT" area 160 displays a "Report Name" 162, an "Owner" 164, a "Report Date Start" 166, a "Report Date End" 168, and a "Report Run On" date and time 170. An Initial Configuration Report is also referred to as an Initial Configuration Estimate or ICE report. The "Report Name" 162 is the name given the ICE report at the time the ICE report is saved. The "Owner" 164 is the name of a user who created the ICE report. The "Report Date Start" 166 displays the start of the date range used for building the ICE report. In various embodiments, the "Report Date Start" 166 is aligned with the start date of the scripts which are played back. The "Report Date End" 168 displays the end of the date range used for building the ICE report. In various embodiments, the "Report Date End" 168 is aligned with the end date of the scripts which are played back. The "Report Run On" date and time 170 displays the date and time that the ICE report is run or executed. In FIG. 5, an Initial Configuration Report is to be created, therefore the "Report Name" 162, the "Owner" 164, the "Report Date Start" 166, the "Report Date End" 168, and the "Report Run On" date and time 170 are set to Not Applicable ("N/A").

In response to activating a "Use Existing" dropdown button 182, a menu of saved ICE reports from which the user can select is displayed.

In response to activating a "Cancel" button 184, no further action is taken and the Application Properties window 110 exits. In response to activating a "Save" button 186, data entered in the Initial Configuration Report tab is saved.

In response to activating a "Create" button 188, the ICE wizard is invoked. The "Create" button 188 causes an Initial Configuration Estimate (ICE) Report to be created based on the specified application name and version, specified record script and specified playback script. In other embodiments, the ICE wizard is invoked in response to activating the "INITIAL CONFIGURATION REPORT" button 106 (FIG. 4).

In various embodiments, and as illustrated above, the ICE wizard is implemented within the application monitor user interface framework. In other embodiments, the ICE wizard is implemented outside the user interface framework of the application monitor.

In response to being invoked, the ICE wizard presents a sequence of windows to lead the user through the ICE process. The user steps through the ICE wizard to specify the server, time period, performance target load and output objectives, response time calculation, and source and target information.

Figure 6:
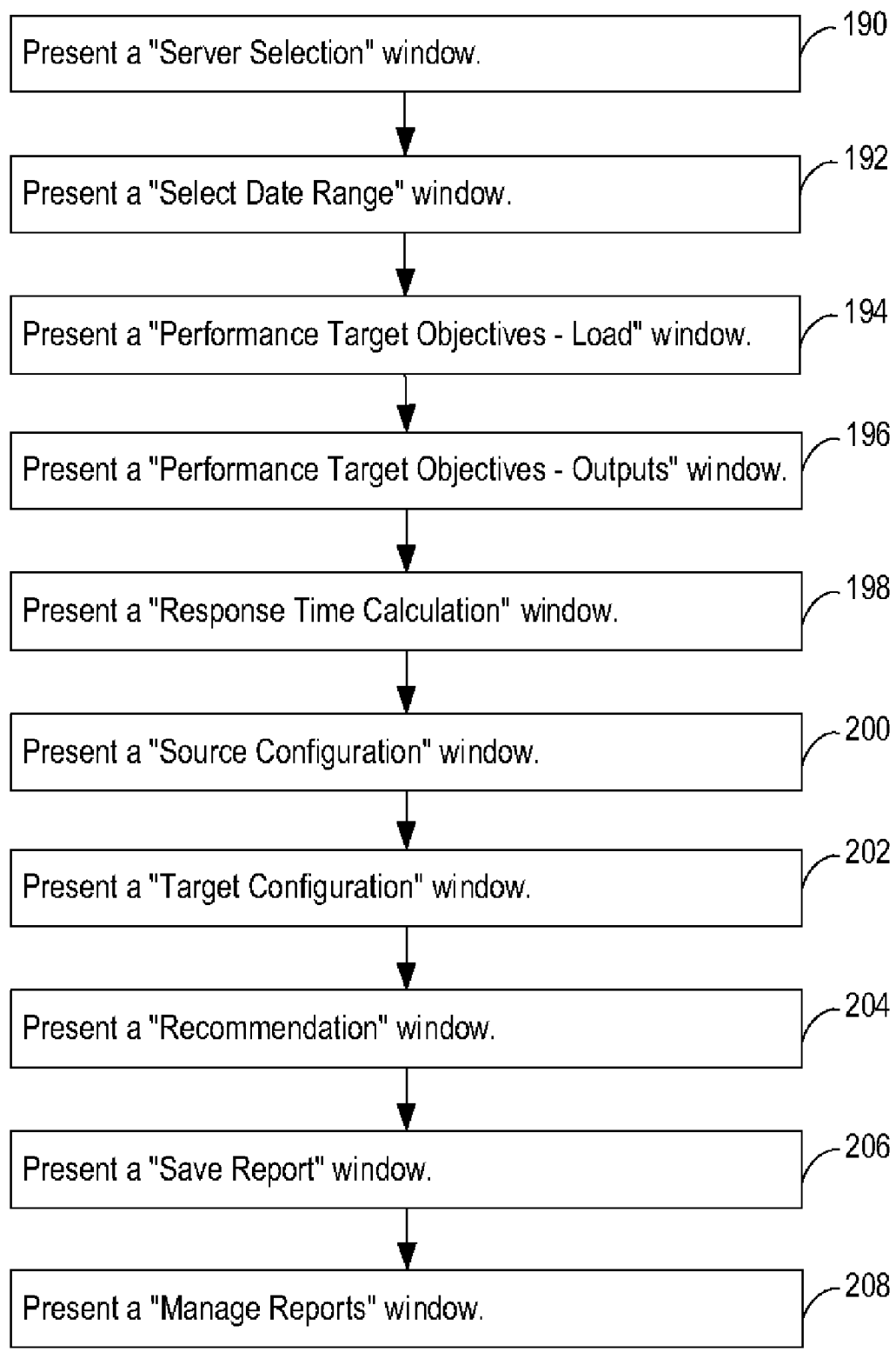
FIG. 6 depicts a flowchart of an embodiment of a sequence of windows presented by an ICE wizard of FIG. 3A.

FIG. 6 depicts a flowchart of an embodiment of a sequence of windows presented by the ICE wizard on a display. In step 190, the ICE wizard presents a "Server Selection" window. In step 192, the ICE wizard presents a "Select Date Range" window. In step 194, the ICE wizard presents a "Performance Target Objectives-Load" window. In step 196, the ICE wizard presents a "Performance Target Objectives-Outputs" window. In step 198, the ICE wizard presents a "Response Time Calculation" window. In step 200, the ICE wizard presents a "Source Configuration" window. In step 202, the ICE wizard presents a "Target Configuration" window. In step 204, the ICE wizard presents a "Recommendation" window. In step 206, the ICE wizard presents a "Save Report" window. In step 208, the ICE wizard presents a "Manage Reports" window.

Figure 7:
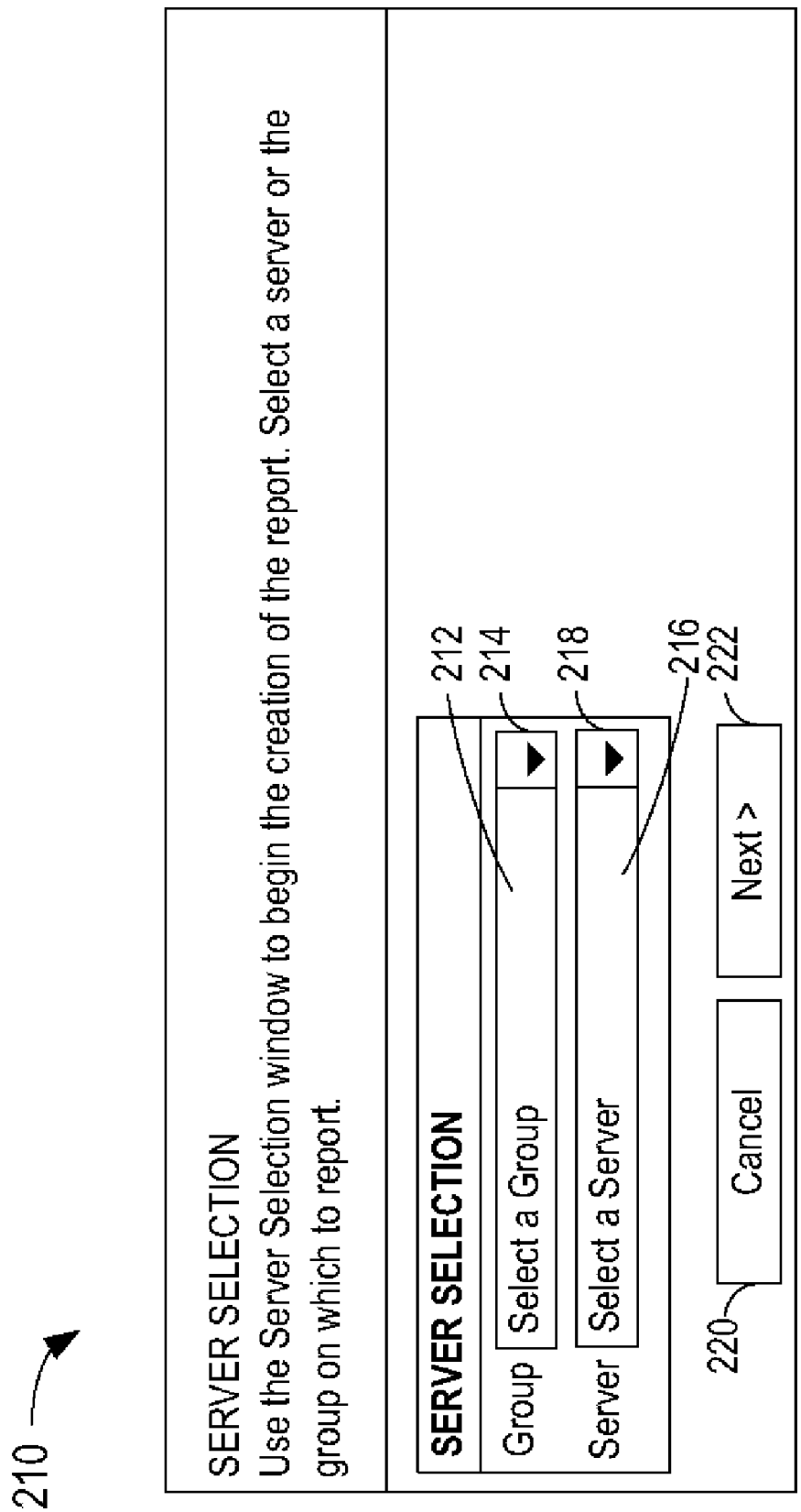
FIG. 7 depicts a diagram of an embodiment of a "Server Selection" window of the ICE wizard of FIG. 6.

FIG. 7 depicts a diagram of an embodiment of the "Server Selection" window 210 of the ICE wizard of FIG. 6. The "Server Selection" window 210 is used to begin the creation of the ICE report. A user selects a single server or an entire group of servers on which to report. The server or group is the server computer or group of server computers, respectively, on which the application is executed and for which the application monitor collects data. The user activates the glyph 214 to display a list of any existing groups and selects an existing group from that list. In response to selecting an existing group, the ICE wizard displays the selected group in the group text box 212. The user activates the glyph 218 to display a list of any existing server computers and selects an existing server computer from that list. The selected server computer is displayed in the server text box 216.

In response to activating a "Cancel" button 220, the ICE wizard exits. In response to activating a "Next>" button 222, the ICE wizard saves the selected group and server in an input data structure, and presents the "Select Date Range" window 230 (FIG. 8).

Figure 8:
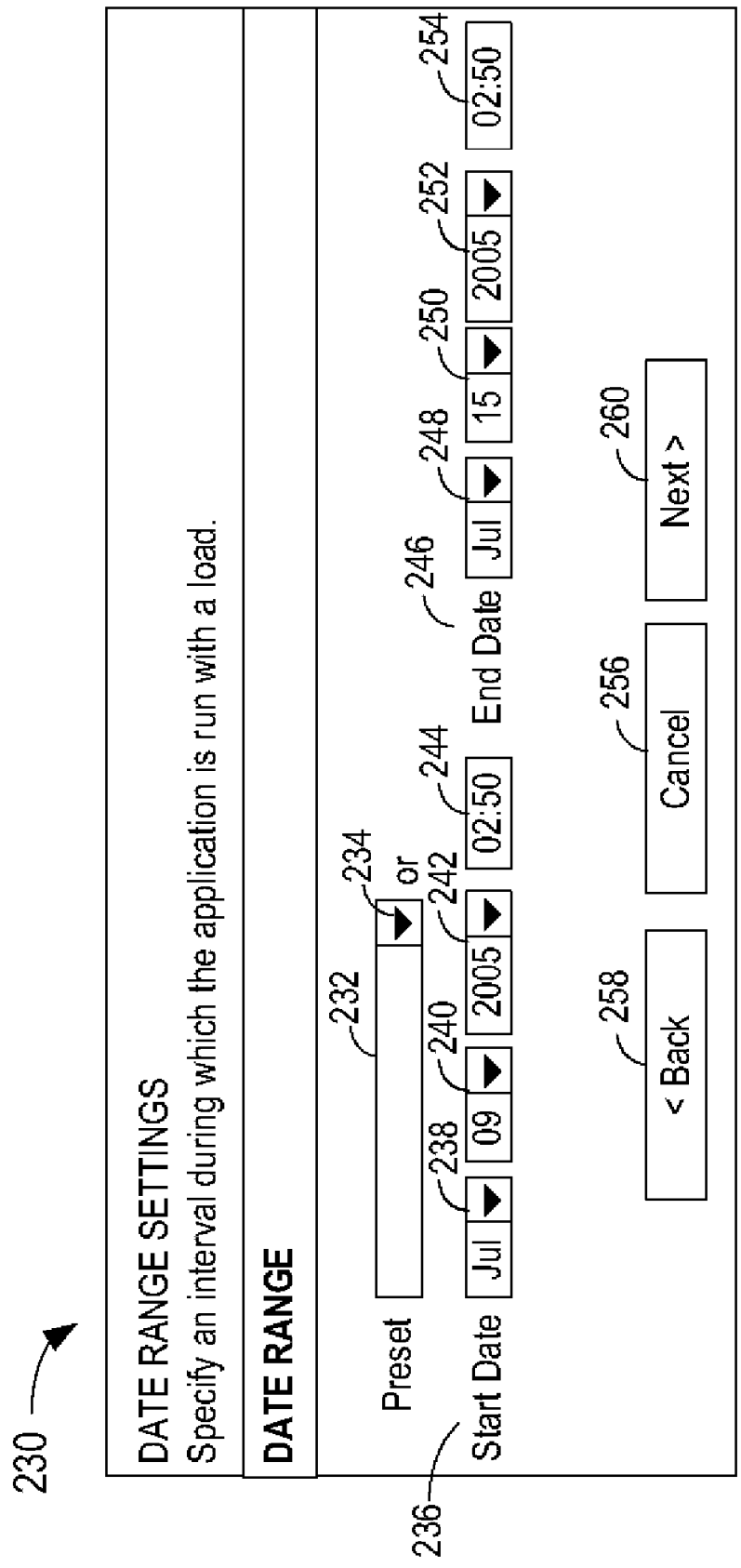
FIG. 8 depicts a diagram of an embodiment of a "Select Date Range" window of the ICE wizard of FIG. 6.

FIG. 8 depicts a diagram of an embodiment of the "Select Date Range" window 230 of the ICE wizard of FIG. 6. The "Select Date Range" window 230 is used to specify date range settings for the analysis, that is, the interval during which the application is executed with a load. The user can select a preset date range or enter a custom start date and end date. A "Preset" text box 232 with an associated glyph 234 is displayed. In response to activating the glyph 234, a list comprising one or more preset date ranges, if any, are displayed and a user can select one of the preset dates. In some embodiments, the application monitor has a default set of preset date ranges. Examples of the preset date ranges are "last day" and "last week". The selected preset date is displayed in the "Start Date" text boxes 232 and "End Date" text boxes 234.

To enter a custom start date 236, the user can select a month, day and year using the month, day and year text-box/glyph pairs, 238, 240 and 242, respectively. The user enters a desired start time in the start-time text box 244. To enter a custom end date 246, the user can select a month, day and year using the month, day and year text-box/glyph pairs, 248, 250 and 252, respectively. The user enters a desired start time in the start-time text box 254. The start date and time is referred to as a start date range setting and the end date and time is referred to as an end date range setting.

In response to activating a "Cancel" button 256, the ICE wizard terminates. In response to activating a "<Back" button, the ICE wizard presents the "Server Selection" window 210 of FIG. 7. In response to activating a "Next>" button 260, ICE wizard saves the start and end dates and times in the input data structure, and presents the "Performance Target Objectives-Load" window 270 of FIG. 9.

Figure 9:
FIG. 9 depicts a diagram of an embodiment of a "Performance Target Objectives-Load" window of the ICE wizard of FIG. 6.

FIG. 9 depicts a diagram of an embodiment of the "Performance Target Objectives-Load" window 270 of the ICE wizard of FIG. 6. The "Performance Target Objectives-Load"

window 270 allows a user to specify a load that the application is to support. Either the specific arrival rate or the page view rate is specified, and the other inputs are optional. In response to a "Specific Arrival Rate" check box 272 being checked, the ICE wizard retrieves the number of user visits per second which is entered in a "User Visits per Second" text box 274. In response to a "Page View Rate" check box 276 being checked, the ICE wizard retrieves a number of page views per second which is entered in a "Page Views per Second" text box 278. In response to an "Average User Session Time" check box 280 being checked, the ICE wizard retrieves an average session time, in seconds, which is entered in an average session time text box 282. In response to a "Number of Concurrent Users" check box 284 being checked, the ICE wizard retrieves a number of concurrent users which is entered in a number of concurrent users text box 286.

In response to activating a "Cancel" button 292, the ICE wizard exits. In response to a "<Back" button 294 being activated, the ICE wizard displays the "Select Date Range" window. In response to activating a "Next>" button 296, the ICE wizard stores the number of user visits per second as a specific arrival rate or the page view rate, depending on whether check box 272 or 274 is checked, stores the average user session time if check box 280 is checked, and the number of concurrent users if the check box 284 is checked, in the input data structure, and displays the "Performance Target Objectives-Outputs" window 300 of FIG. 10. In various embodiments, either the specific arrival rate or the page view rate is stored in the input data structure, but not both.

Figure 10:
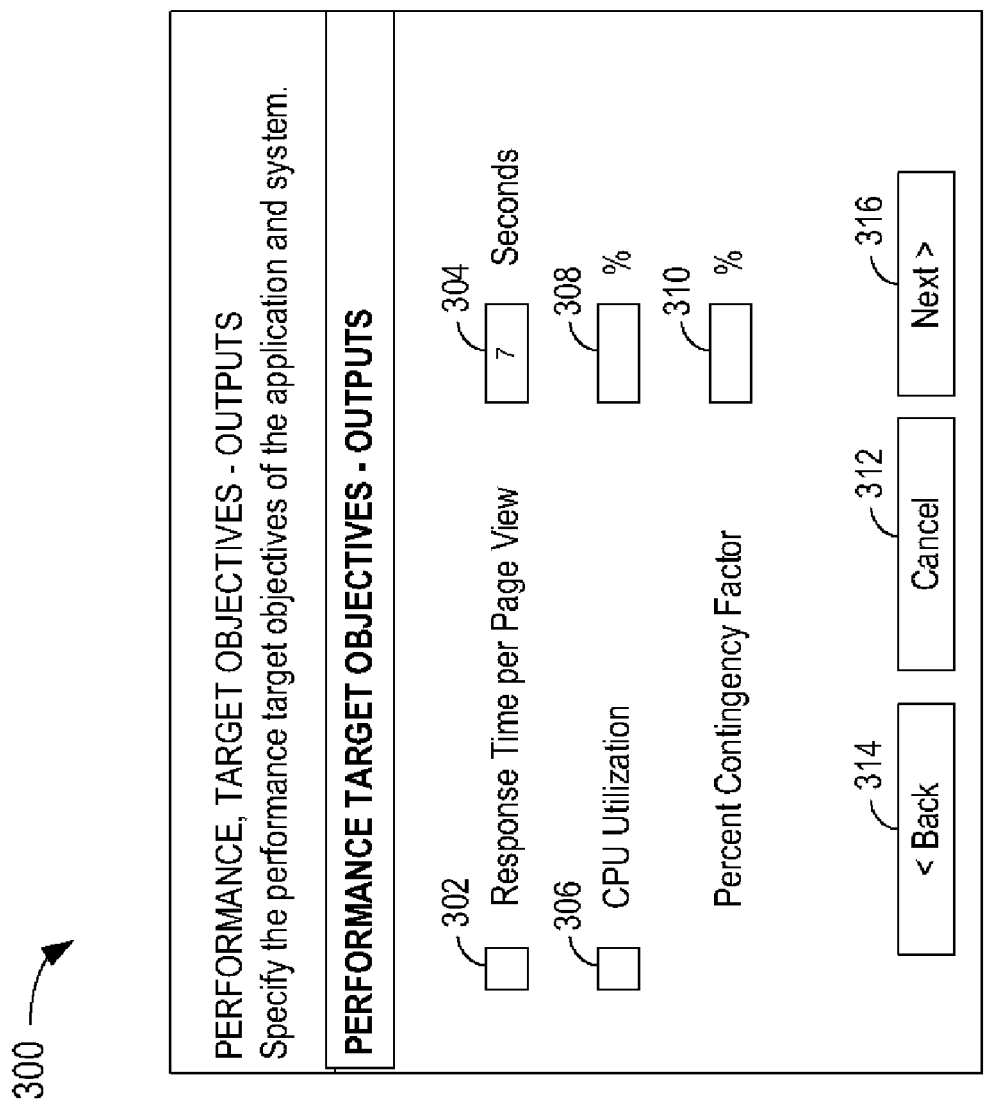
FIG. 10 depicts a diagram of an embodiment of a "Performance Target Objectives-Outputs" window of the ICE wizard of FIG. 6.

FIG. 10 depicts a diagram of an embodiment of the "Performance Target Objectives-Outputs" window 300 of the ICE wizard of FIG. 6. The "Performance Target Objectives-Outputs" window 300 is used to specify the performance target objectives of the application and system. In response to a "Response Time per Page View" check box 302 being checked, the ICE wizard retrieves a response time per page view value which is entered in a response time per page view text box 304. In response to a "CPU Utilization" check box 306 being checked, the ICE wizard retrieves a CPU utilization value which is entered in CPU utilization text box 308. The ICE wizard retrieves a "Percent Contingency Factor" which is entered in the percent contingency factor text box 310, as a percentage. The percent contingency factor is a parameter which is used by the analytic engine to extrapolate a worst-case scenario. The percent contingency factor is used by the analytic engine to simulate more erratic workloads than the workload on which data is collected.

In response to activating a "Cancel" button 312, the ICE wizard exits. In response to a "<Back" button 314 being activated, the ICE wizard displays the "Performance Target Objectives-Load" window. In response to activating a "Next>" button 316, the ICE wizard stores the response time per page view and CPU utilization if their associated check box is checked, and the percent contingency factor in the input data structure, and displays the "Response Time Calculation" window 320 of FIG. 11.

Figure 11:
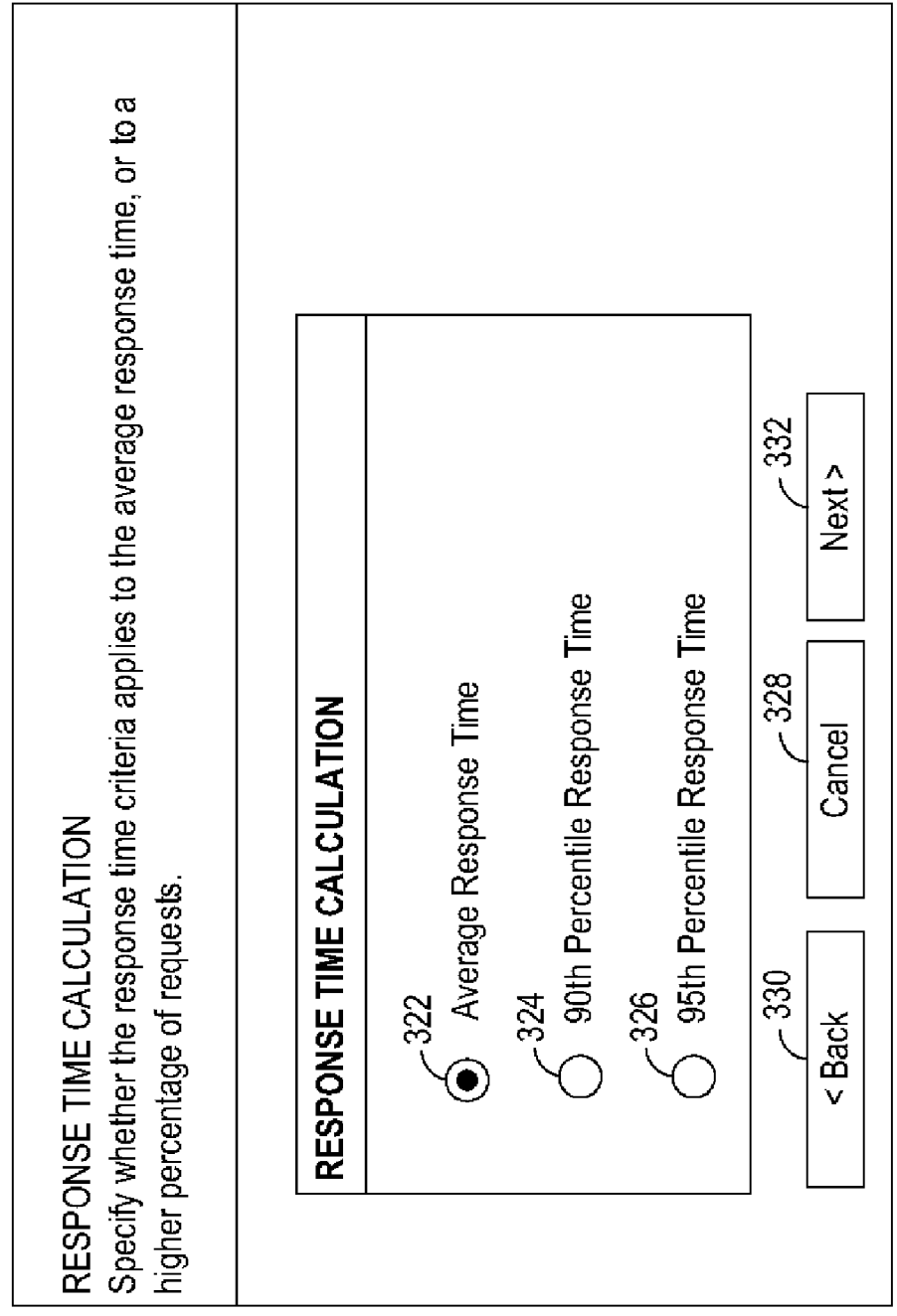
FIG. 11 depicts a diagram of an embodiment of a "Response Time Calculation" window of the ICE wizard of FIG. 6.

FIG. 11 depicts a diagram of an embodiment of a "Response Time Calculation" window 320 of the ICE wizard of FIG. 6. The "Response Time Calculation" window 320 is used to specify whether the response time criteria applies to the average response time, or to a higher percentage of requests, in some embodiments, a higher percentage of all requests. The "Response Time Calculation" window 320 allows a user to specify whether the response time criteria applies to the average response time, or to a higher percentage of requests. The response time criteria comprises the "Response Time per Page View" target objective of FIG. 10.

Three radio buttons, 322, 324 and 326, allow a user to specify one of an "Average Response Time", a "90th Percentile Response Time", and a "95th Percentile Response Time," respectively. The radio buttons 322, 324 and 326 are mutually exclusive. The ICE wizard provides an indication of the selected response time calculation to the analytic engine, and the analytic engine provides a configuration recommendation in accordance with the indication of the selected response time calculation. For example, a successful workload may have an average response time which below a specified performance target objective, but still have individual requests that exceed the performance target objective. In response to providing the $90^{th}$ or $95^{th}$ percentile setting to the analytic engine, the analytic engine applies the $90^{th}$ or $95^{th}$ percentile setting to the response time performance target objective, by enforcing that either nine out of ten requests for the $90^{th}$ percentile setting, or nineteen out of twenty requests for the $95^{th}$ percentile setting, meet the specified performance target objective In response to activating a "Cancel" button 328, the ICE wizard exits. In response to activating a "<Back" button 330, the ICE wizard displays the "Performance Target Objectives-Outputs" window 300 of FIG. 10. In response to activating a "Next>" button 316, the ICE wizard stores an indication representing the selected type of response time, and displays the "Source Configuration" window 340 of FIG. 12.

Figure 12:
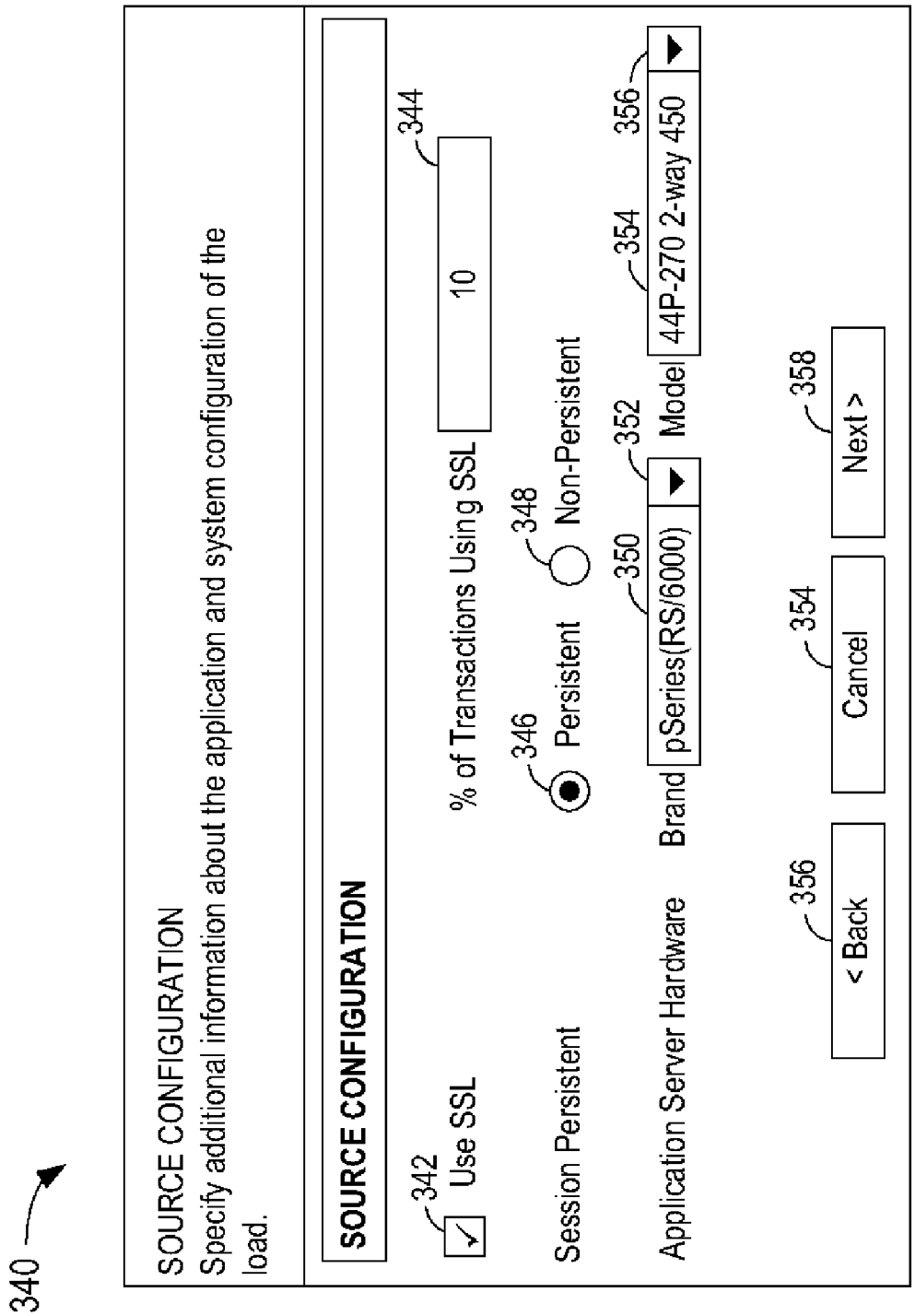
FIG. 12 depicts a diagram of an embodiment of a "Source Configuration" window of the ICE wizard of FIG. 6.

FIG. 12 depicts a diagram of an embodiment of a "Source Configuration" window 340 of the ICE wizard of FIG. 6. The "Source Configuration" window 340 is used to specify additional information about the application and configuration of the computer system which is executing the application for which the load is being monitored to gather performance data.

In response to a "Use SSL" checkbox 342 being checked, the ICE wizard receives a percentage (%) of transactions using Secure Sockets Layer (SSL) of the source system in a "% of Transactions Using SSL" text box 344. The source session persistence is selected by a user, and is received by the ICE wizard, using the "Persistent" and "Non-Persistent" radio buttons, 346 and 348, respectively. The application server hardware of the source system is specified using a "Brand" text box 350 and associated glyph 352. In response to activating the glyph 352, a list of source brands is displayed and the user selects one of the source brands from the list which is displayed in the "Brand" text box 350. In various embodiments, the list of source brands comprises hardware, for example, Web Application Servers that execute Windows NT, AIX, Linux, MVS, Linux_PPC, Solaris and HP-UX. However, in other embodiments, other source brands may be used. A source model is also specified using a "Model" text box 354 and associated glyph 356. In response to activating the glyph 356, a list of source models is displayed and the user selects one of the source models from the list which is displayed in the "Model" text box 356. For example, a source brand may be a "pSeries (RS/6000) and the Model may be a "P670 4-way 1500." In various embodiments, the list of source brands and source models is provided with the ICE wizard.

In response to activating a "Cancel" button 354, the ICE wizard exits. In response to activating a "<Back" button 356, the ICE wizard displays the "Response Time Calculation" window 320 of FIG. 11. In response to activating a "Next>" button 358, the ICE wizard stores the percentage of transactions using SSL if the "Use SSL" checkbox 342 is checked, an indication of the specified session persistence, the selected brand and the selected model in the input data structure, and displays the "Target Configuration" window 360 of FIG. 13.

Figure 13:
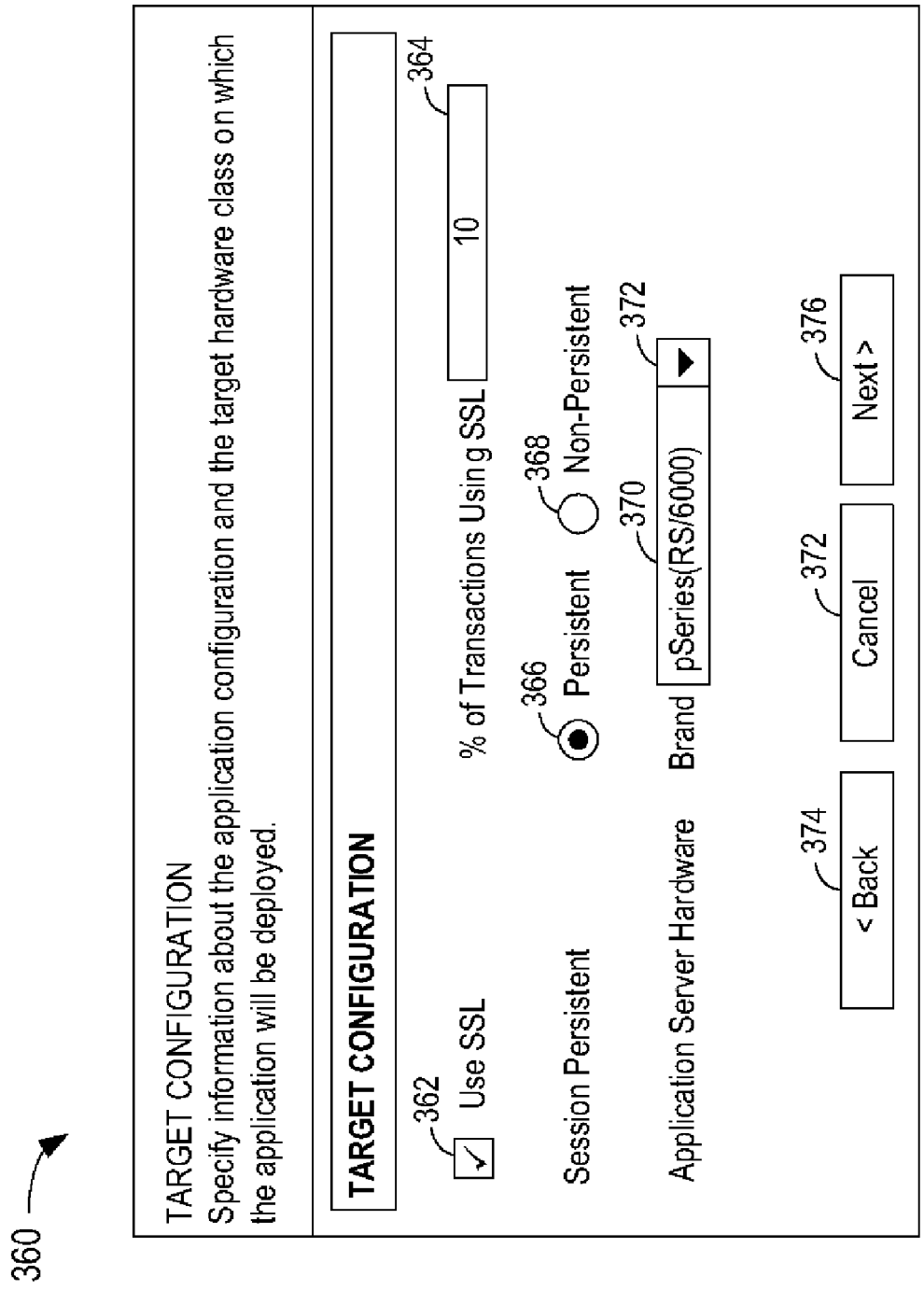
FIG. 13 depicts a diagram of an embodiment of a "Target Configuration" window of the ICE wizard of FIG. 6.

FIG. 13 depicts a diagram of an embodiment of a "Target Configuration" window 360 of the ICE wizard of FIG. 6. The "Target Configuration" window 360 is used to specify information about the application configuration and the target hardware class on which the application will be deployed.

In response to a "Use SSL" checkbox 362 being checked, the ICE wizard receives a percentage (%) of transactions using Secure Sockets Layer of the target system in a "% of Transactions Using SSL" text box 364. The target session persistence is selected by a user, and received by the ICE wizard, using the "Persistent" and "Non-Persistent" radio buttons, 366 and 368, respectively. The target application server hardware class is specified using a "Brand" text box 370 and associated glyph 372. In response to activating the glyph 372, a list of target brands is displayed and the user selects one of the target brands from the list which is displayed in the "Brand" text box 370. In various embodiments, the list of target brands is the same as in the list of source brands Source Configuration window 340 of FIG. 12.

In response to activating a "Cancel" button 372, the ICE wizard exits. In response to activating a "<Back" button 374, the ICE wizard displays the "Source Configuration" window 340 of FIG. 12. In response to activating a "Next>" button 376, the ICE wizard stores the target percentage of transactions using SSL if the checkbox 362 is checked, the selected target session persistence and the target brand in the input data structure, calculates one or more performance measurements, invokes the analytic engine and displays the "Recommendation" window 400 of FIG. 15.

Figure 14:
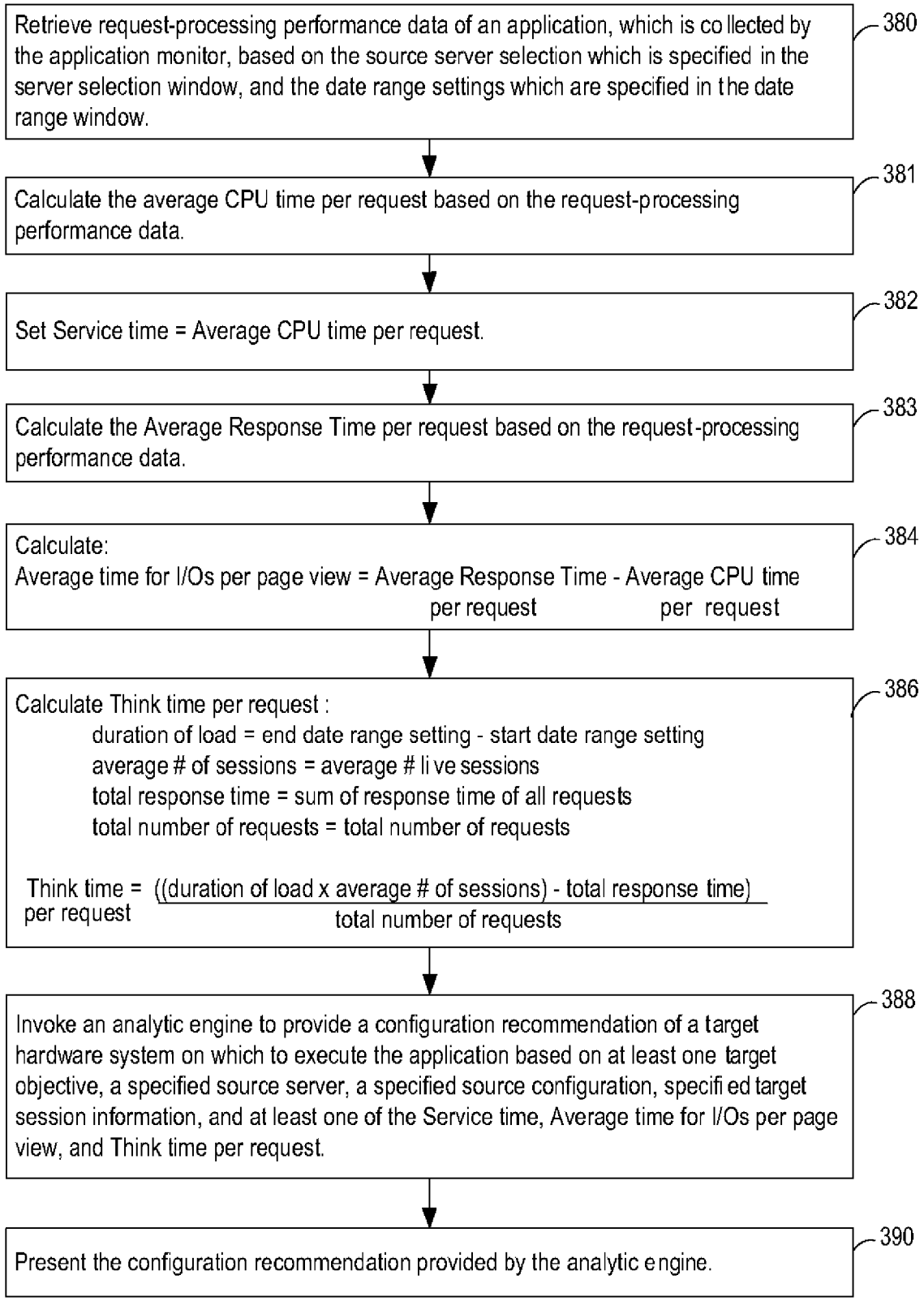
FIG. 14 depicts a flowchart of an embodiment of calculations performed by the ICE wizard.

FIG. 14 depicts a flowchart of calculations performed by the ICE wizard. In response to activating the "Next>" button 376 of FIG. 13, the ICE wizard performs the flowchart of FIG. 14. The flowchart of FIG. 14 transforms the performance data which is gathered by the application monitor into one or more performance measurements which are usable by the analytic engine. In various embodiments, the performance measurements comprise an "Average CPU time per request", an "Average time for I/Os per page view", and a "Think time per request". The Average time for I/Os per page view refers to an Average time for Input/Outputs per page view.

In step 380, the ICE wizard retrieves request-processing performance data from the application monitor based on the server selection, and in some embodiments, the group, which is specified in the server selection window, and the date range settings which are specified in the date range window. The request-processing performance data comprises a list of CPU times and response times for the requests which are received within the start and end date range settings which are specified in the date range window. A request may be considered to be within the start and end date range settings if the start date and time of the request is greater than or equal to the start date range setting and less than or equal to the end date range setting. Alternately, a request may be considered to be within the start and end date range settings if the start date and time of the request is greater than the start date range setting and less than the end date range setting.

Figure 1:
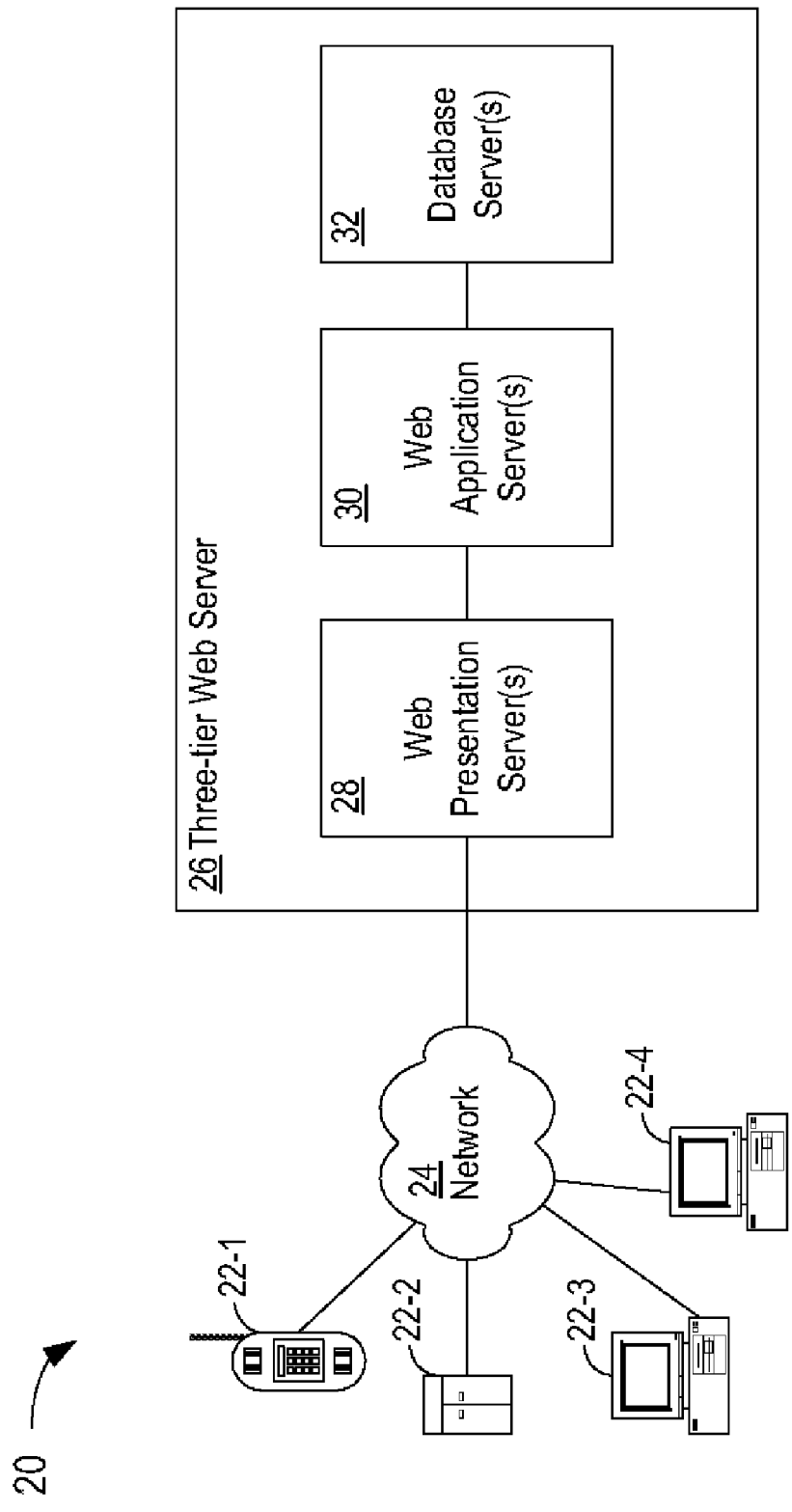
FIG. 1 depicts a diagram of an exemplary web application environment.

In various embodiments, a request can be any type of request which the application monitor can monitor, such as a request for a web page or data. Examples of requests comprise Servlets, Java Server Pages (JSPs), Enterprise Java Beans (EJBs), Portlets and standalone Java DataBase Connectivity (JDBC) calls, such as in the third tier of the three-tier architecture described above with reference to FIG. 1.

In step 381, the ICE wizard calculates the average CPU time per request based on the request-processing performance data. The ICE wizard calculates the average CPU time per request based on the total number of requests within the start and end date range settings which are specified in the date range window. The total CPU time is calculated from the individual CPU time which is captured by the application monitor for individual requests. The start and end date range settings define which requests are included in the calculation of the total CPU time. The total CPU time is equal to the sum of the CPU times of the individual requests within the start and end date range settings. The total CPU time is divided by the number of requests within the start and end date range settings to provide the average CPU time per request.

In other embodiments, the application monitor directly measures the average CPU time per request, and the ICE wizard queries the application monitor to retrieve the average CPU time per request.

In step 382, the ICE wizard sets the "Service time" equal to the average CPU time per request. The ICE wizard stores the Service time in the input data structure.

In step 383, the ICE wizard calculates the "Average Response Time per request" based on the request-processing performance data. The response time per request represents an amount of time between receiving a request, for example, for a web page, and responding to that request, for example, returning the web page, for the requests within the start and end date range settings. The ICE wizard sums the response times of the requests which are retrieved in step 381, and divides the sum by the number of requests to provide the Average Response Time per request.

In step 384, the ICE wizard calculates the "Average time for Input/Outputs (I/Os) per page view" as follows:

Average time for I/Os per page view=Average Response Time per request−Average CPU time per request.

The ICE wizard stores the "Average time for I/Os per page view" in the input data structure.

In other embodiments, the application monitor directly measures the "Average time for I/Os per page view", and the ICE wizard queries the application monitor to retrieve the "Average time for I/Os per page view".

In step 386, the ICE wizard calculates a "Think time per request". The Think time per request is calculated based on the requests which are received by the application within the start and end date range settings. In various embodiments, the Think time represents an amount of time during which the system is not actually processing a request, but waiting for resources to become available. Examples of resources comprise the CPU and database connection pools. The ICE wizard calculates a duration of load which is equal to the end date range setting minus the start date range setting which are specified in the date range window.

The ICE wizard sets an average number (#) of sessions equal to an average number (#) of live sessions. In various embodiments, each time the user requests a new web page, that request is a distinct request. The session is a device which allows a server to provide a seemingly continuous request-response experience to a user. A session is an amount of memory which the server uses to identify a user and the user's previous activity. A "live" session corresponds to an active request. Sessions are typically maintained in expectation of a user submitting another request. Therefore, at any point in time, the sessions that the server maintains can be divided into a group of sessions that correspond to users for whom the system is actively processing requests, and another group of sessions which the server is maintaining with an expectation that the user will issue a subsequent request. After a predetermined interval of time, the system terminates the sessions that are no longer active to save memory.

The ICE wizard retrieves a total number of live sessions during the specified date range settings from the application monitor The total number of live sessions represents a total number of simultaneous live sessions at any point in time during the start and end date range settings, and is used as the average number of sessions.

The ICE wizard sets a total response time equal to the sum of the response time of all requests at the server within the start and end date range settings which are specified in the date range window.

The ICE wizard determines the total number of requests which are received by the application at the server that are within the start and end date range settings which are specified in the date range window.

The ICE wizard calculates the Think time per request as follows:

$$\frac{\text{Think time}}{\text{request}} = \frac{((\text{duration of load} \times \text{average \# of sessions}) - \text{total response time})}{\text{total number of requests}}$$

The ICE wizard stores the Think time per request in the input data structure.

In other embodiments, the application monitor directly measures the Think time per request, and the ICE wizard queries the application monitor to retrieve the Think time per request.

In step 388, the ICE wizard invokes the analytic engine to provide a configuration recommendation of a target hardware system on which to execute the application based on at least one target objective, a specified source server, a specified source configuration, a specified target session information, and at least one of the Service time, Average time for I/Os per page view, and think time. In various embodiments, the analytic engine receives data from the ICE wizard using the input data structure, and provides the configuration recommendation based on at least one parameter of the input data structure. Typically one or more instructions are executed on a data processing system to invoke the analytic engine. In various embodiments, the analytic engine provides an application programming interface comprising one or more instructions which can be used to invoke the analytic engine.

In various embodiments, the ICE wizard invokes the analytic engine, via an application programming interface, and provides the Service Time, Average time for I/Os per page view, and the Think Time, along with the specified source configuration of the "Source Configuration Window", and one or more specified performance targets which are specified in the "Performance Target Objectives-Load" window, the "Performance Target Objectives-Outputs" window, "Response Time Calculation" window and "Target Configuration" window, to the analytic engine via the input data structure.

In some embodiments, the analytic engine recommends a hardware configuration of a user-specified target hardware system. In other embodiments, for example, if no target hardware system is specified, the analytic engine recommends a target hardware system.

In various embodiments, the analytic engine implements a technique described in U.S. patent application Ser. No. 10/174,030, entitled "Method, System and Article of Manufacture for an Analytic Modeling Technique for Handling Multiple Objectives," to determine a configuration recommendation. For example, in some embodiments, the analytic engine uses the actual Service time, Average time for I/Os per page view, and Think time per request that is provided by the ICE wizard to calculate response times to estimate the performance of a target computer system.

In some embodiments, the analytic engine implements a technique described in application Ser. No. 10/686,988, entitled "Autonomic Computing Algorithm for Identification of an Optimum Configuration for a Web Infrastructure," to determine a configuration recommendation.

Figure 15:
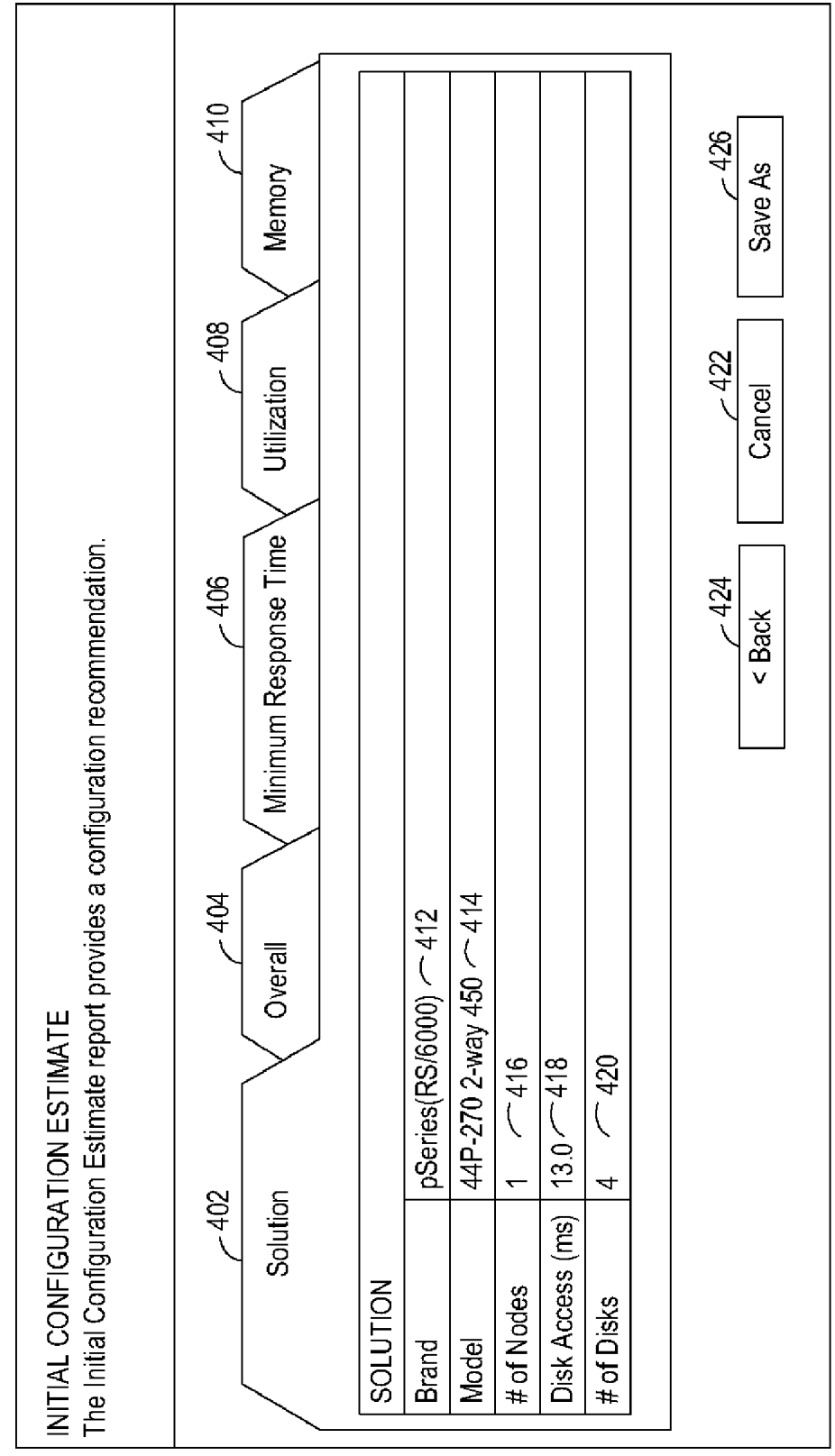
FIG. 15 depicts a diagram of an embodiment of a "Recommendation" window of the ICE wizard of FIG. 6.

In step 390, the ICE wizard displays the configuration recommendation provided by the analytic engine in the "Recommendation" window 400 of FIG. 15. The values in the "Recommendation" window 400 are provided to the ICE wizard by the analytic engine in the configuration-recommendation data structure.

FIG. 15 depicts a diagram of an embodiment of a "Recommendation" window 400 of the ICE wizard of FIG. 6. The "Recommendation" window 400 provides an Initial Configuration Estimate report which provides configuration approximations based on the objectives and the actual baseline performance of the source configuration.

The configuration recommendation provided by the analytic engine is displayed in tabs comprising a "Solution" tab 402, an "Overall" tab 404, a "Minimum Response Time" tab 406, a "Utilization" tab 408, and a "Memory" tab 410. The "Solution" tab 402 displays a Brand 412, Model 414, number of nodes 416, disk access time in milliseconds (ms) 418, and a number (#) of disks 420.

In response to activating a "Cancel" button 422, the ICE wizard exits. In response to activating a "<Back" button 424, the ICE wizard displays the "Target Configuration" window 360 of FIG. 13. In response to a "Next>" button 424 being activated, the ICE wizard displays the "Save Report" window 470 of FIG. 20.

Figure 16:
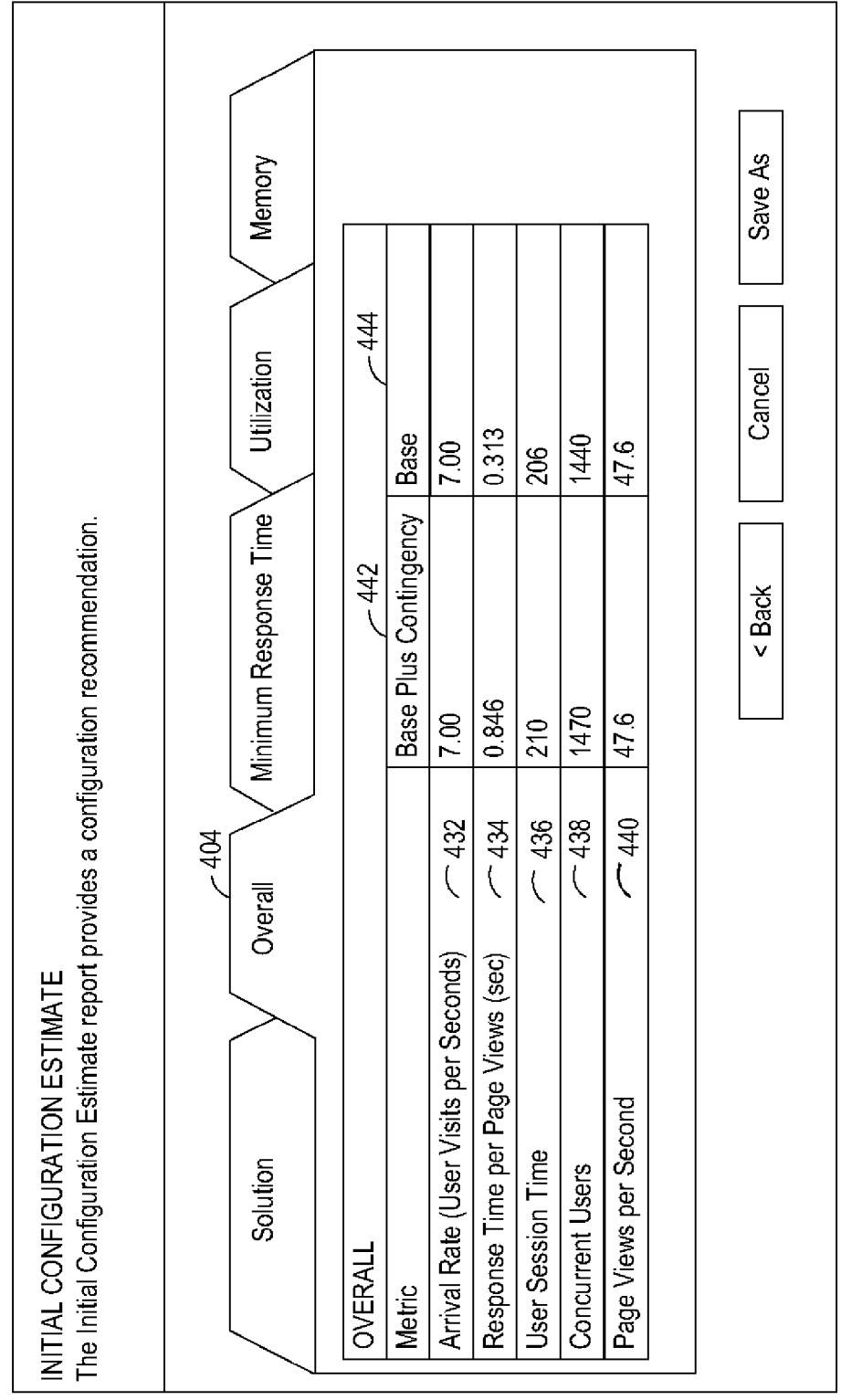
FIG. 16 depicts a diagram of an embodiment of an "Overall" tab of the "Recommendation" window of the ICE wizard of FIG. 6.

FIG. 16 depicts a diagram of an embodiment of an "Overall" tab of the "Recommendation" window 400 of the ICE wizard of FIG. 6. The "Overall" tab 400 displays various overall metrics comprising an "Arrival Rate" (Number of User Visits per Second) 432, a "Response Time per Page Views" in seconds 434, a "User Session Time" 436, a number of "Concurrent Users" 438, and a number of "Page Views per Second" 440. A "Base Plus Contingency" 442 value and a "Base" 444 value are provided for each metric.

Figure 17:
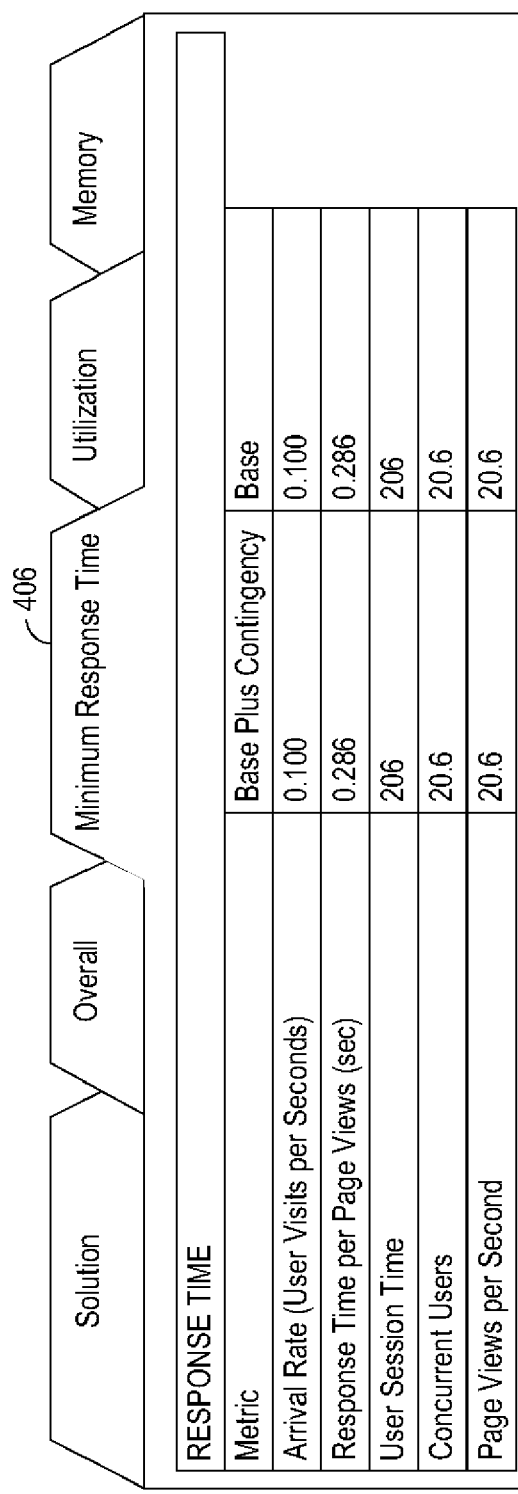
FIG. 17 depicts a diagram of an embodiment of the "Response Time" tab of the "Recommendation" window of the ICE wizard of FIG. 6.

FIG. 17 depicts a diagram of an embodiment of the "Minimum Response Time" tab 406 of the "Recommendation" window 400 of the ICE wizard of FIG. 6. In various embodiments, the "Minimum Response Time" tab 400 displays values of the "Arrival Rate", "Response Time per Page Views", "User Session Time", "Concurrent Users", and "Page Views per Second" which are expected in a lightly loaded system. These values are provided by the analytic engine. In some embodiments, the analytic engine does not provide these values and the "Minimum Response Time" tab 406 is omitted.

Figure 18:
FIG. 18 depicts a diagram of an embodiment of the "Utilization" tab of the "Recommendation" window of the ICE wizard of FIG. 6.

FIG. 18 depicts a diagram of an embodiment of the "Utilization" tab 408 of the "Recommendation" window 400 of the ICE wizard of FIG. 6. The "Utilization" tab 408 displays the expected average CPU Utilization 452 and Disk Utilization 454 of the recommendation configuration. A "Base Plus Contingency" value 456 and a "Base" value 458 are provided for each metric.

Figure 19:
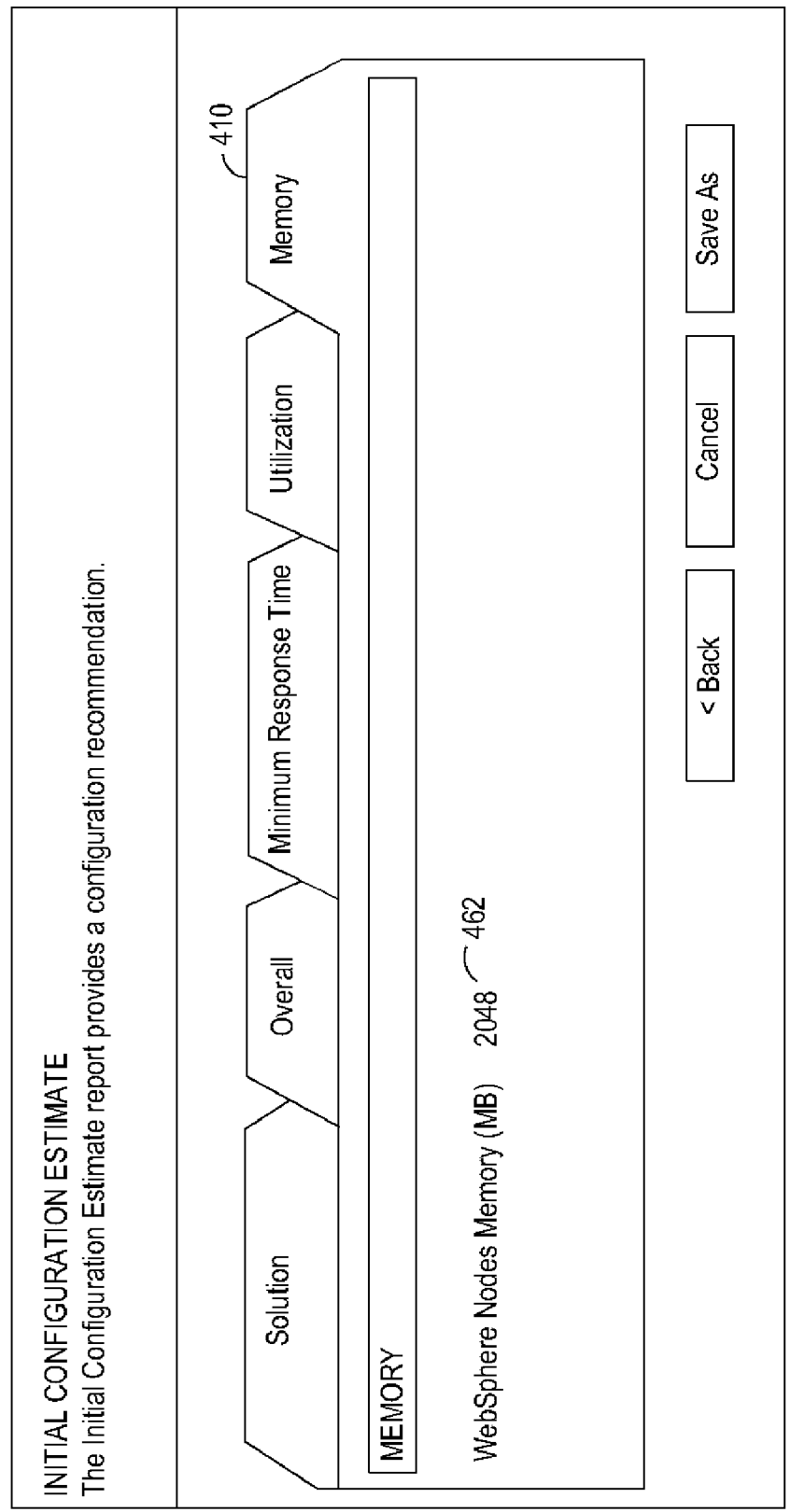
FIG. 19 depicts a diagram of an embodiment of the "Memory" tab of the "Recommendation" window of the ICE wizard of FIG. 6.

FIG. 19 depicts a diagram of an embodiment of the "Memory" tab 410 of the "Recommendation" window 400 of the ICE wizard of FIG. 6. The "Memory" tab 410 displays a recommendation of an amount of memory 462 of the in Megabytes (MB).

Figure 20:
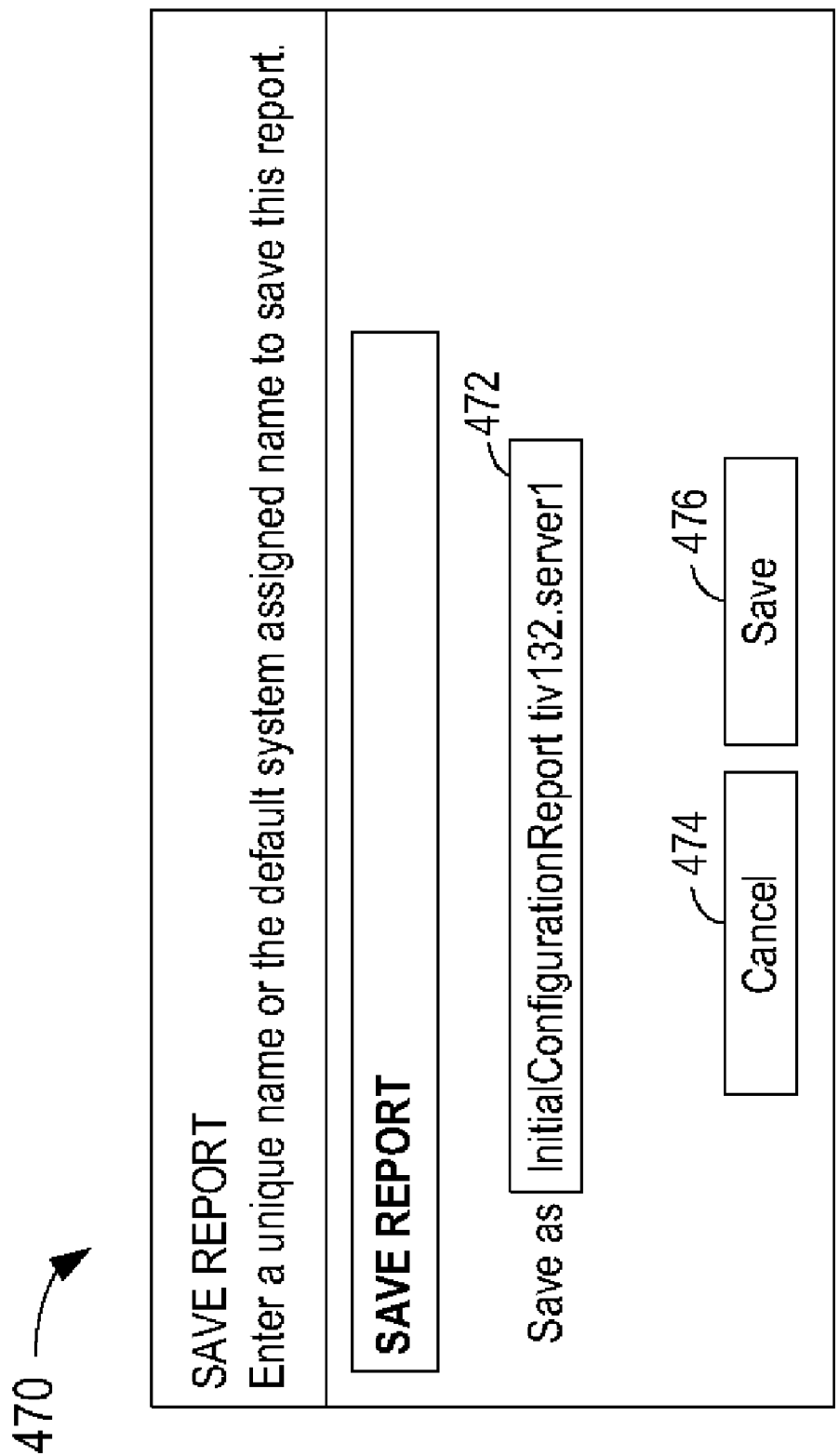
FIG. 20 depicts a diagram of an embodiment of a "Save Report" window of the ICE wizard of FIG. 6.

FIG. 20 depicts a diagram of an embodiment of the "Save Report" window 470 of the ICE wizard of FIG. 6. The Save Report" window 470 allows a user to enter a unique name or the default system assigned name to save the ICE report. A "Save as" text box 472 receives a report name from a user. In response to a "Cancel" button 474 being activated, the ICE wizard exits. In response to a "Save" button 476 being activated, the ICE wizard displays the "Manage Reports" window 480 of FIG. 21.

Figure 21:
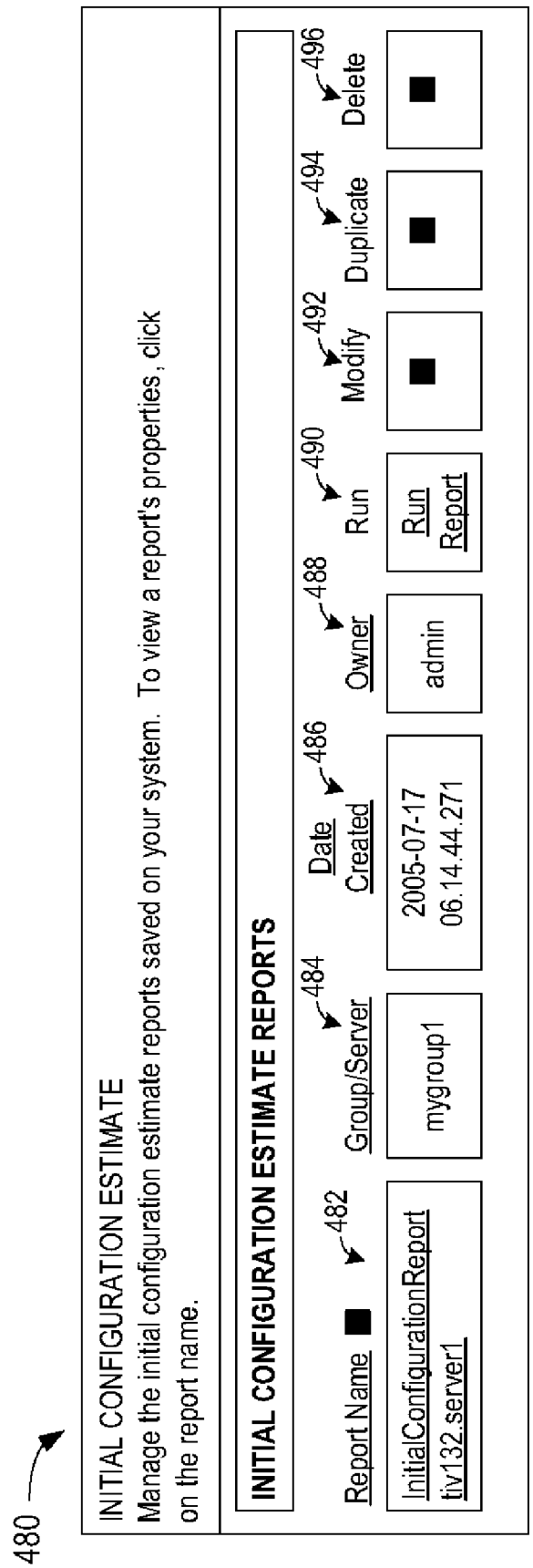
FIG. 21 depicts a diagram of an embodiment of a "Manage Reports" window of the ICE wizard of FIG. 6.

FIG. 21 depicts a diagram of an embodiment of a "Manage Reports" window 480 of the ICE wizard of FIG. 6. The "Manage Reports" window 480 allows a user to manage the ICE reports which are saved. To view an ICE report's properties, activate, for example click on, the report name 482. A Group server 484, Date Created 486 and Owner 488 are displayed. In response to activating a "Run Report" button 490, the ICE wizard runs the ICE report. In response to activating a "Modify" button 492, the ICE wizard provides the user with the ICE report definition so that the user can modify the ICE report. In response to activating a "Duplicate" button 494, the ICE wizard prompts the user for a report name, and creates a new ICE report with the same definition as the existing ICE report. In response to activating a "Delete" button 496, the ICE wizard deletes the associated ICE report.

Various embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, various embodiments of the invention can take the form of a computer program product accessible from a computer usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital video disk (DVD). The term "computer readable storage medium" is defined to be any apparatus that can store the program for use by or in connection with the instruction execution system, apparatus, or device, such as semiconductor or solid state memory, magnetic tape, a removable computer diskette, a random access memory (RAM), a read-only memory (ROM), a rigid magnetic disk and an optical disk. The term "computer usable communication medium" is defined to be any apparatus that can communicate, propagate, or transport the program for use by or in connection with the instruction execution system, apparatus, or device.

Figure 22:
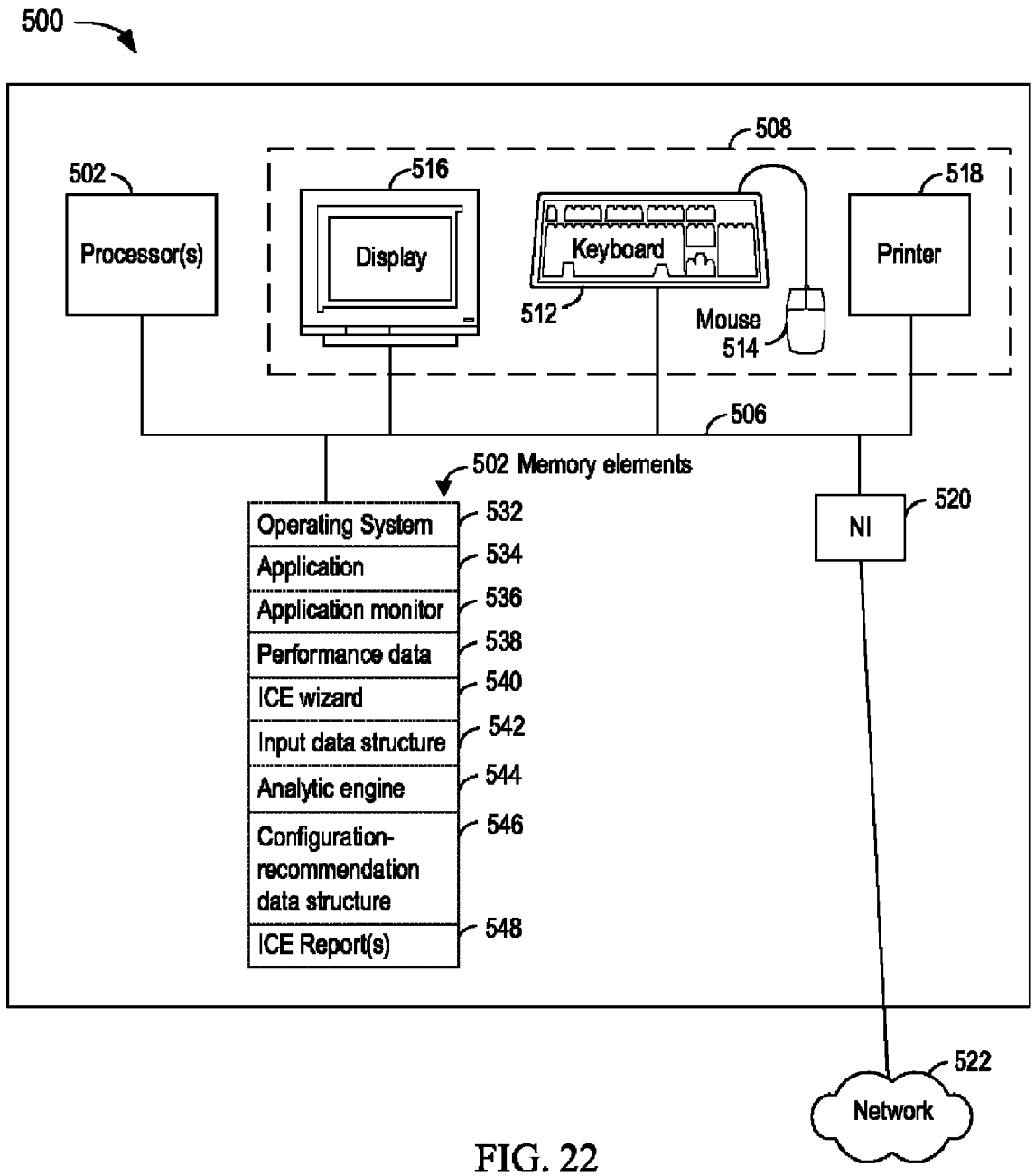
FIG. 22 depicts an illustrative data processing system which uses various embodiments of the present invention.

FIG. 22 depicts an illustrative data processing system 500 which uses various embodiments of the present invention. The data processing system 500 suitable for storing and/or executing program code will include at least one processor 502 coupled directly or indirectly to memory elements 504 through a system bus 506. The memory elements 504 can include local memory employed during actual execution of the program code, bulk storage, and cache memories which provide temporary storage of at least some program code in order to reduce the number of times code must be retrieved from bulk storage during execution.

Input/output or I/O devices 508 (including but not limited to, for example, a keyboard 512, pointing device such as a mouse 514, a display 516, printer 518, etc.) can be coupled to the system bus 506 either directly or through intervening I/O controllers.

Network adapters, such as a network interface (NI) 520, may also be coupled to the system bus 506 to enable the data processing system to become coupled to other data processing systems or remote printers or storage devices through intervening private or public networks 522. Modems, cable modem and Ethernet cards are just a few of the currently available types of network adapters. The network adapter may be coupled to the network 522 via a network transmission line, for example twisted pair, coaxial cable or fiber optic cable, or a wireless interface that uses a wireless transmission medium. In addition, the software in which various embodiments are implemented may be accessible through the transmission medium, for example, from a server over the network.

The memory elements 502 store an operating system 532, the application 534, the application monitor 536, performance data 538 which is collected by the application monitor, the ICE wizard 540, the input data structure 542, the analytic engine 544, the configuration-recommendation data structure 546 that contains the configuration recommendation provided by the analytic engine 544, and one or more ICE Reports 548. In some embodiments, the analytic engine 544 and ICE wizard 540 are combined. In various embodiments, the application 534, application monitor 536 and performance data 548 are on a different data processing system from the data processing system containing the ICE wizard 540 and analytic engine 544.

The operating system 532 may be implemented by any conventional operating system such as the z/OS®, MVS®, OS/390®, AIX®, UNIX®, Windows®, LINUX®, Solaris® or HP-UX® operating system.

The exemplary data processing system 500 illustrated in FIG. 22 is not intended to limit the present invention. Other alternative hardware environments may be used without departing from the scope of the present invention.

Figure 23:
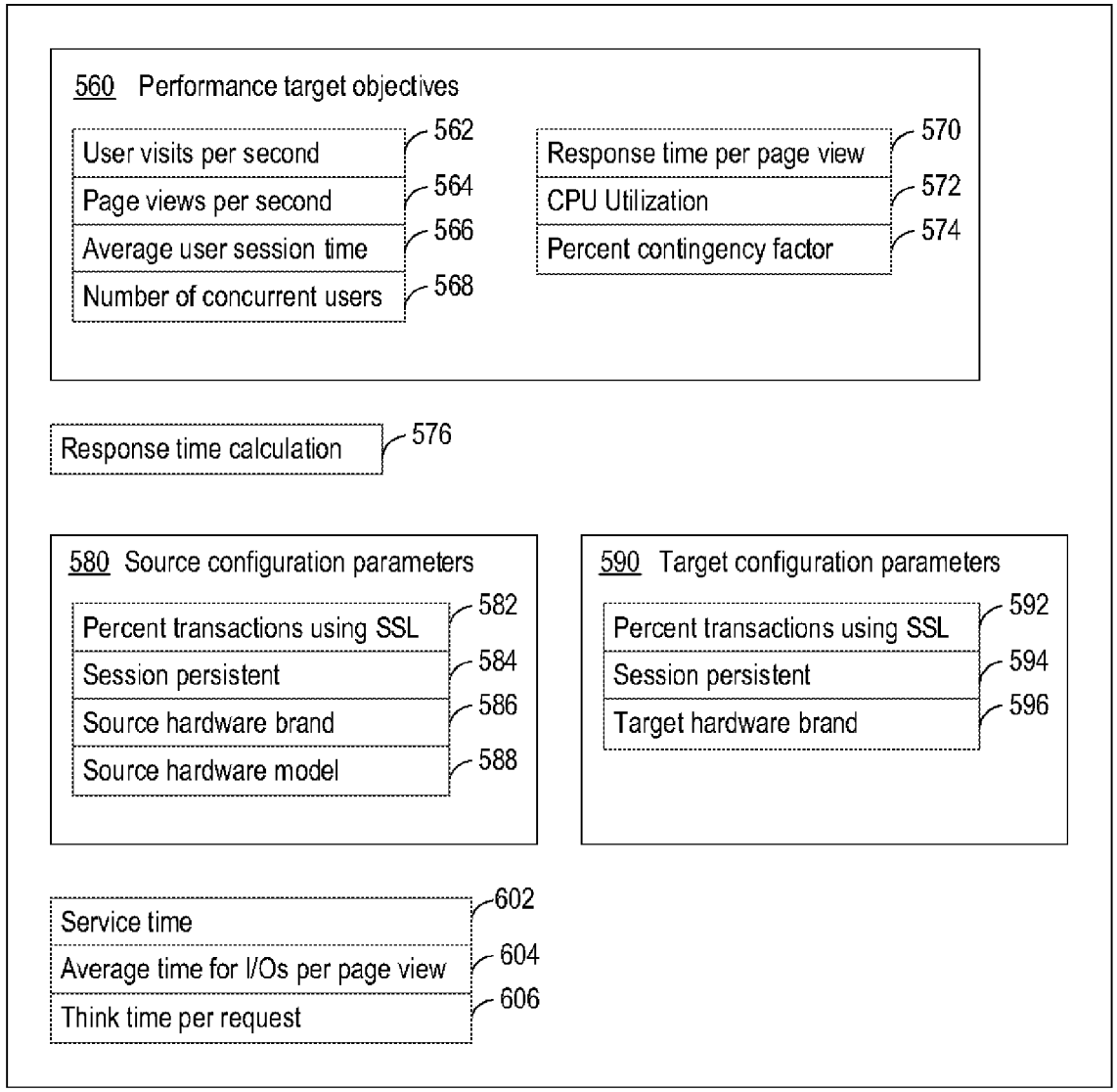
FIG. 23 depicts an embodiment of an input data structure provided by the ICE wizard to the analytic engine of the data processing system of FIG. 22.

FIG. 23 depicts an embodiment of the input data structure 542 of FIG. 22. The user input data structure 542 comprises performance target objectives 560, a response time calculation indicator 576, source configuration parameters 580, target configuration parameters 590, the Service time 602, Average time for I/Os per page view 604 and Think time 606. The response time calculation indicator 576 is provided in the "Response Time Calculation" window 320 (FIG. 11). In various embodiments, the ICE wizard calculates the Service time 602, Average time for I/Os per page view 604 and Think time per request 606.

The performance target objectives 560 comprise user visits per second 562, page views per second 564, average user session time 566, number of concurrent users 568, response time per page view 570, CPU utilization 572 and percent contingency factor 574. The performance target objectives 560 are provided in the "Performance Target Objectives" windows 270 (FIG. 9) and 300 (FIG. 10).

The source configuration parameters 580 are input in the "Source Configuration" window 340 (FIG. 12) comprise the percent transactions using SSL 582, session persistent indicator 584, source hardware brand 586 and source hardware model 588. The target configuration parameters 580 are input in the "Target Configuration" window 360 (FIG. 14) comprise the percent transactions using SSL 592, session persistent indicator 594, and target hardware brand 596. In some embodiments, the target hardware brand 596 is not supplied and the analytic engine recommends a target hardware brand.

The foregoing detailed description of various embodiments of the invention has been presented for the purposes of illustration and description. It is not intended to be exhaustive or to limit the invention to the precise form disclosed. Many modifications and variations are possible in light of the above teachings. It is intended that the scope of the invention be limited not by this detailed description, but rather by the claims appended thereto.

Trademarks

IBM®, z/OS®, MVS®, OS/390® and AIX® trademarks of International Business Machines Corporation in the United States, other countries, or both. Windows® is a registered trademark of Microsoft Corporation. LINUX® is a registered trademark of Linus Torvalds. Java is and all Java-based trademarks are trademarks of Sun Microsystems, Inc. in the United States, other countries, or both. Solaris® is a registered trademark of Sun Microsystems Inc. HP-UX® is a registered trademark of Hewlett-Packard Development Company, L.P. UNIX® is a registered trademark of the Open Group in the United States and other countries.

What is claimed is:

1. A computer-implemented method, comprising:
retrieving request-processing performance data of an application, wherein said request-processing performance data is collected by an application monitor during an execution of said application on a source hardware system;
determining request-processing performance measurements based on said request-processing performance data, said request-processing performance measurements comprising an average response time per request, an average central processing unit time per request and an average time for input/outputs per page view, wherein said average time for input/outputs per page view is equal to a difference between said average response time per request and said average central processing unit time per request;
receiving at least one target objective of said application; and
invoking an analytic engine to provide a configuration recommendation of a target hardware system on which to execute said application based on said request-processing performance measurements comprising said average time for input/outputs per page view, and said at least one target objective.

2. The method of claim 1 further comprising:
receiving a start date range setting and an end date range setting;
wherein said retrieving retrieves said request-processing performance data that is collected within said start date range setting and said end date range setting; and
wherein said determining determines said request-processing performance measurements based on said request-processing performance data that is collected within said start date range setting and said end date range setting.

3. The method of claim 1 further comprising:
receiving at least one source hardware identifier indicating a source hardware system on which said execution of said application is performed;
wherein said invoking invokes said analytic engine to provide said configuration recommendation also based on said source hardware identifier.

4. The method of claim 1 further comprising:
receiving at least one source hardware identifier identifying a source hardware system on which said execution of said application is performed;
receiving a target hardware identifier specifying said target hardware system on which to execute said application;
wherein said invoking invokes said analytic engine to provide said configuration recommendation also based on said at least one source hardware identifier and said target hardware identifier.

5. The method of claim 1 wherein said request-processing performance data is based on a load driven against said application, said load comprising requests from users of said application.

6. The method of claim 1 wherein said request-processing performance data is based on a load driven against said application, said load being based on a playback of one or more recorded scripts.

7. The method of claim 3 further comprising:
prompting a user to provide said at least one target objective and said at least one source hardware identifier.

8. The method of claim 2 further comprising:
presenting at least one window prompting a user to enter said at least one target objective, said start date range setting and said end date range setting.

9. The method of claim 1
wherein said determining said request-processing performance measurements determines said average central processing unit time per request based on said request-processing performance data, and
wherein said invoking invokes said analytic engine to provide said configuration recommendation also based on said average central processing unit time per request.

10. The method of claim 1 wherein said request-processing performance measurements comprise a think time,
wherein said determining said request-processing performance measurements comprises calculating said think time based on said request-processing performance data, and
wherein said invoking invokes said analytic engine to provide said configuration recommendation also based on said think time.

11. The method of claim 10 further comprising:
receiving a start date range setting and an end date range setting;
retrieving a number of concurrent users of said application within said start date range setting and said end date range setting;
retrieving a number of requests received by said application within said start date range setting and said end date range setting; and
determining a total response time of said requests based on said performance data;
wherein said calculating said think time is based on said start date range setting, said end date range setting, said number of users, said total response time, and said number of requests.

12. A computer program product for providing a configuration recommendation, said computer program product comprising:

a non-transitory computer readable storage medium;
first program instructions to retrieve request-processing performance data of an application, wherein said request-processing performance data is collected by an application monitor during an execution of said application on a source hardware system;
second program instructions to determine request-processing performance measurements based on said request-processing performance data, said request-processing performance measurements comprising an average response time per request, an average central processing unit time per request and an average time for input/outputs per page view, wherein said average time for input/outputs per page view is equal to a difference between said average response time per request and said average central processing unit time per request;
third program instructions to receive at least one target objective of said application; and
fourth program instructions to invoke an analytic engine to provide a configuration recommendation of a target hardware system on which to execute said application based on said request-processing performance measurements comprising said average time for input/outputs per page view, and said at least one target objective;
wherein said first, second, third and fourth program instructions are stored on said non-transitory computer readable storage medium.

13. The computer program product of claim 12 further comprising:
fifth program instructions to receive a start date range setting and an end date range setting;
wherein said request-processing performance data is collected within said start date range setting and said end date range setting; and
wherein said request-processing performance measurements are determined based on said request-processing performance data that is collected within said start date range setting and said end date range setting;
wherein said fifth program instructions are stored on said non-transitory computer readable storage medium.

14. The computer program product of claim 12 further comprising:
fifth program instructions to receive at least one source hardware identifier of said source hardware system;
wherein said fourth program instructions invoke said analytic engine to provide said configuration recommendation also based on said at least one source hardware identifier;
wherein said fifth program instructions are stored on said non-transitory computer readable storage medium.

15. The computer program product of claim 12 further comprising:
fifth program instructions to receive at least one source hardware identifier identifying said source hardware system; and
sixth program instructions to receive a target hardware identifier identifying said target hardware system on which to execute said application;
wherein said fourth program instructions invoke said analytic engine to provide said configuration recommendation also based on said source hardware identifier, and said target hardware identifier;
wherein said fifth and sixth program instructions are stored on said non-transitory computer readable storage medium.

16. The computer program product of claim 12 wherein said request-processing performance data is based on a load driven against said application, said load comprising requests from users of said application.

17. The computer program product of claim 12 wherein said request-processing performance data is based on a load driven against said application, said load being based on a playback of one or more recorded scripts.

18. The computer program product of claim 14, further comprising:
sixth program instructions to prompt a user to provide said at least one target objective and said at least one source hardware identifier;
wherein said sixth program instructions are stored on said non-transitory computer readable storage medium.

19. The computer program product of claim 13 further comprising:
sixth program instructions to present at least one window that prompts a user to enter said at least one target objective, said start date range setting and said end date range setting;
wherein said sixth program instructions are stored on said non-transitory computer readable storage medium.

20. The computer program product of claim 12, wherein said second program instructions calculate said average central processing unit time per request based on said request-processing performance data, and
wherein said fourth program instructions invoke said analytic engine to provide said configuration recommendation also based on said average central processing unit time per request.

21. The computer program product of claim 12 wherein said request-processing performance measurements comprise a think time,
wherein said second program instructions calculate said think time based on said request-processing performance data; and
wherein said fourth program instructions invoke said analytic engine to provide said configuration recommendation also based on said think time.

22. The computer program product of claim 21 further comprising:
fifth program instructions to receive a start date range setting and an end date range setting;
sixth program instructions to retrieve a number of concurrent users of said application within said start date range setting and said end date range setting;
seventh program instructions to retrieve a number of requests received by said application within said start date range setting and said end date range setting; and
eighth program instructions to determine a total response time of said requests based on said performance data;
wherein said second program instructions calculate said think time based on said start date range setting, said end date range setting, said number of concurrent users, said total response time, and said number of requests;
wherein said fifth, sixth, seventh and eighth program instructions are stored on said non-transitory computer readable storage medium.

23. A data processing system, comprising:
a processor;
a memory storing instructions, executable by said processor, to:
retrieve request-processing performance data of an application, wherein said request-processing performance data is collected by an application monitor during an execution of said application on a source hardware system;

determine request-processing performance measurements based on said request-processing performance data, said request-processing performance measurements comprising an average response time per request, an average central processing unit time per request and an average time for input/outputs per page view, wherein said average time for input/outputs per page view is equal to a difference between said average response time per request and said average central processing unit time per request;

receive at least one target objective of said application; and invoke an analytic engine to provide a configuration recommendation of a target hardware system on which to execute said application based on said request-processing performance measurements comprising said average time for input/outputs per page view, and said at least one target objective.

24. The data processing system of claim 23, said memory further comprising:
said analytic engine.

25. The data processing system of claim 23, said memory further comprising:
an application monitor that gathers said request-processing performance data during an execution of said application.

26. The data processing system of claim 23, said memory further comprising:
instructions to receive a start date range setting and an end date range setting;
wherein said request-processing performance data is collected within said start date range setting and said end date range setting; and
wherein said request-processing performance measurements are based on said request-processing performance data that is collected within said start date range setting and said end date range setting.

27. The data processing system of claim 23 wherein said request-processing performance data is based on a load driven against said application, said load comprising requests from users of said application.

28. The data processing system of claim 23 wherein said request-processing performance data is based on a load driven against said application, said load being based on a playback of one or more recorded scripts.

29. The data processing system of claim 23 said memory further comprising:
instructions to present at least one window prompting a user to provide said at least one target objective and at least one source hardware identifier,
wherein said instructions invoke said analytic engine to provide said configuration recommendation also based on said at least one source hardware identifier.

30. The data processing system of claim 26 said memory further comprising:
instructions to present at least one window prompting a user to enter said at least one target objective, at least one source hardware identifier, said start date range setting and said end date range setting,
wherein said instructions invoke said analytic engine to provide said configuration recommendation also based on said at least one source hardware identifier.

31. The data processing system of claim 23
wherein said average central processing unit time per request is determined based on said request-processing performance data, and
wherein said instructions invoke said analytic engine to provide said configuration recommendation also based on said average central processing unit time per request.

32. The data processing system of claim 23 wherein said request-processing performance measurements comprise a think time based on said request-processing performance data; and
wherein said instructions invoke said analytic engine to provide said configuration recommendation also based on said think time.

33. The method of claim 11 wherein said total response time of said requests is based on said requests received by said application within said start date range setting and said end date range setting, wherein a duration is equal to a difference between said end date range setting and said start date range setting, wherein said number of requests is a total number of requests, wherein said think time is equal to $$((\text{said duration} \times \text{an average number of sessions}) - \text{said total response time})/\text{said total number of requests}.$$

34. The computer program product of claim 22 wherein said total response time of said requests is based on said requests received by said application within said start date range setting and said end date range setting, wherein a duration is equal to a difference between said end date range setting and said start date range setting, wherein said number of requests is a total number of requests, wherein said think time is equal to $$((\text{said duration} \times \text{an average number of sessions}) - \text{said total response time})/\text{said total number of requests}.$$

35. The data processing system of claim 32, said memory comprising instructions to:
receive a start date range setting and an end date range setting;
retrieve a number of concurrent users of said application within said start date range setting and said end date range setting;
retrieve a number of requests received by said application within said start date range setting and said end date range setting; and
determine a total response time of said requests based on said performance data;
wherein said instructions to determine said request-processing performance measurements calculate a think time, wherein said total response time of said requests is based on said requests received by said application within said start date range setting and said end date range setting, wherein a duration is equal to a difference between said end date range setting and said start date range setting, wherein said number of requests is a total number of requests, wherein said think time is equal to $$((\text{said duration} \times \text{an average number of sessions}) - \text{said total response time})/\text{said total number of requests}.$$

* * * * *